US009733737B2

(12) United States Patent
Chen et al.

(10) Patent No.: US 9,733,737 B2
(45) Date of Patent: Aug. 15, 2017

(54) TOUCH PANEL AND METHODS FOR FORMING THE SAME

(71) Applicant: TPK Touch Solutions (Xiamen) Inc., Xiamen (CN)

(72) Inventors: Yu-Jen Chen, Tainan (TW); Ching-Shan Lin, Kaohsiung (TW); Chan-Hao Tseng, Kaohsiung (TW); Cheng-Chung Chiang, Kaohsiung (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 168 days.

(21) Appl. No.: 14/172,834

(22) Filed: Feb. 4, 2014

(65) Prior Publication Data
US 2014/0218641 A1   Aug. 7, 2014

(30) Foreign Application Priority Data

Feb. 4, 2013   (CN) .......................... 2013 1 0050268

(51) Int. Cl.
*G06F 3/041*   (2006.01)
(52) U.S. Cl.
CPC .... *G06F 3/041* (2013.01); *G06F 2203/04107* (2013.01)
(58) Field of Classification Search
CPC ............. G06F 2203/04111; G06F 2203/04103
See application file for complete search history.

(56) References Cited

U.S. PATENT DOCUMENTS

| 6,847,355 | B1* | 1/2005 | Nishikawa | ................. C09J 9/02 178/18.01 |
| --- | --- | --- | --- | --- |
| 2008/0143683 | A1* | 6/2008 | Hotelling | .............. G06F 3/0416 345/173 |
| 2009/0090694 | A1* | 4/2009 | Hotelling | ................ G06F 3/044 216/41 |
| 2010/0201640 | A1* | 8/2010 | Nozawa | .................. G06F 3/045 345/173 |
| 2012/0113042 | A1* | 5/2012 | Bayramoglu | ........... G06F 3/044 345/174 |

(Continued)

FOREIGN PATENT DOCUMENTS

| CN | 101876866 | 11/2010 |
| --- | --- | --- |
| CN | 101968704 | 2/2011 |

(Continued)

*Primary Examiner* — Nalini Mummalaneni
(74) *Attorney, Agent, or Firm* — Paul Bendemire

(57) ABSTRACT

A touch panel is disclosed. The touch panel includes a cover plate having a viewing region and a border region surrounding the viewing region. At least one bonding region is defined in the border region. A shielding layer is disposed on the cover plate corresponding to the border region. An adhesive pattern layer is disposed on the shielding layer and at least in the bonding region. A sensing electrode layer is disposed on the cover plate and extends from the viewing region to the shielding layer corresponding to the border region. A signal trace layer including a plurality of traces is disposed on the shielding layer corresponding to the border region. Each trace has one end electrically connected to the sensing electrode layer and another end assembled onto the adhesive pattern layer corresponding to the bonding region. A method for forming a touch panel is also disclosed.

19 Claims, 24 Drawing Sheets

(56) References Cited

U.S. PATENT DOCUMENTS

| | | | | |
|---|---|---|---|---|
| 2012/0211264 A1* | 8/2012 | Milne | ...................... | G06F 3/044 |
| | | | | 174/250 |
| 2012/0268402 A1* | 10/2012 | Wang | ...................... | G06F 3/041 |
| | | | | 345/173 |
| 2013/0038545 A1* | 2/2013 | Hsu | ........................ | G06F 3/041 |
| | | | | 345/173 |
| 2013/0162552 A1* | 6/2013 | Huang | .................... | G06F 3/044 |
| | | | | 345/173 |

FOREIGN PATENT DOCUMENTS

| | | |
|---|---|---|
| TW | 420775 | 1/2012 |
| TW | 201219905 | 5/2012 |

\* cited by examiner

TOUCH PANEL AND METHODS FOR FORMING THE SAME

BACKGROUND OF THE INVENTION

The present invention claims the priority of China Patent Application No. 201310050268.1 filed on Feb. 4, 2013, which is incorporated by reference in the present application in its entirety.

FIELD OF THE INVENTION

The invention relates to a touch panel, and in particular to a touch panel capable of improving the adhesion of traces of the touch panel and methods for forming the same.

DESCRIPTION OF THE RELATED ART

As developments advance the information technology field, touch devices provide a way to deliver information between humans and machines. A common touch device comprises two major parts, such as a touch panel and a display panel, in which the touch panel having a single layer structure is a technical development trend in the art. The touch panel having a single layer structure comprises a viewing region, and a border region surrounding the viewing region, and the major structure thereof comprises a cover plate, a shielding layer formed on the cover plate corresponding to the border region, touch-sensing components formed on the cover plate corresponding to the viewing region, and traces formed on the shielding layer to electrically connect the touch-sensing components. The shielding layer is configured to shield the traces and prevent the traces from being viewed when the touch device is in use. The traces are configured to deliver electrical signals from the touch-sensing components. In general, one end of a trace is electrically connected to the touch-sensing components, and the other end of the trace is assembled to at least one bonding region. The end of the trace assembled to the bonding region delivers the signals from the touch-sensing components to a processor by a flexible circuit board. In the conventional method for forming a touch panel, since the adhesion of traces on the shielding layer is poor, signal traces can be peeled off the shielding layer due to stress induced by bonding the flexible circuit board, thereby reducing the yield of the touch panel.

Accordingly, there exists a need in the art for development of a touch panel and methods for forming the same capable of mitigating or eliminating the aforementioned problems.

BRIEF SUMMARY OF THE INVENTION

An exemplary embodiment of a touch panel according to the invention is provided. The touch panel comprises a cover plate having a viewing region and a border region surrounding the viewing region, wherein at least one bonding region is defined in the border region. A shielding layer is disposed on the cover plate corresponding to the border region. An adhesive pattern layer is disposed on the shielding layer and at least in the bonding region. A sensing electrode layer is disposed on the cover plate and extends from the viewing region to the shielding layer corresponding to the border region. A signal trace layer is disposed on the shielding layer corresponding to the border region, wherein the signal trace layer comprises a plurality of traces, and each trace has one end electrically connected to the sensing electrode layer and an another end assembled onto the adhesive pattern layer corresponding to the bonding region.

An exemplary embodiment of a method for forming a touch panel according to the invention is provided. The method comprises forming a shielding layer on a cover plate, wherein the cover plate has a viewing region, and a border region surrounding the viewing region, and wherein at least one bonding region is defined in the border region and the shielding layer is disposed in the border region. An adhesive pattern layer is formed on the shielding layer and at least in the bonding region. A sensing electrode layer is formed on the cover plate and extends from the viewing region to the shielding layer corresponding to the border region. A signal trace layer is formed on the shielding layer corresponding to the border region, wherein the signal trace layer comprises a plurality of traces, and each trace has one end electrically connected to the sensing electrode layer and an another end assembled onto the adhesive pattern layer corresponding to the bonding region.

According to the touch panel of the invention, the problem of the traces peeling off the shielding layer can be addressed by disposing an adhesive pattern layer between the shielding layer and the traces, so as to improve the yield of the touch panel.

BRIEF DESCRIPTION OF DRAWINGS

The invention can be more fully understood by reading the subsequent detailed description and examples with references made to the accompanying drawings, wherein:

FIGS. 1C-1, 1C-2 and 1C-3 are plan views of various exemplary embodiments of an arrangement of an adhesive pattern layer according to the invention;

FIGS. 5C-1, 5C-2 and 5C-3 are plan views of various exemplary embodiments of an arrangement of an adhesive pattern layer according to the invention;

DETAILED DESCRIPTION OF INVENTION

Figure 1A:
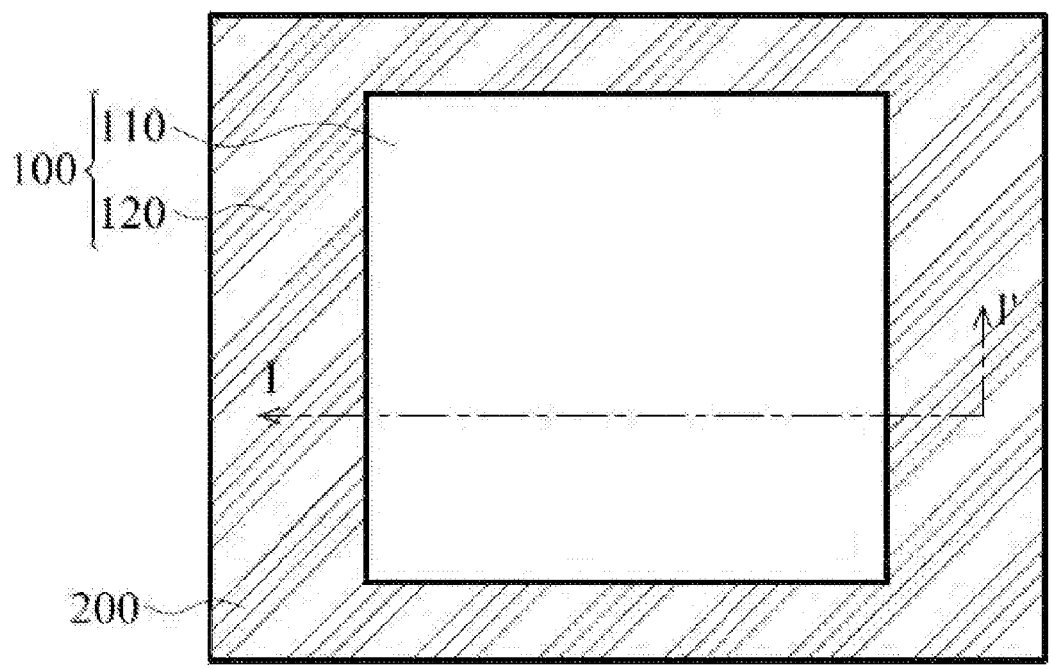
FIGS. 1A to 1E are plan views of an exemplary embodiment of a method for forming a structure of a touch panel according to the invention.

The following description is of the best-contemplated mode of carrying out the invention. This description is provided for the purpose of illustrating the general principles of the invention and should not be taken in a limiting sense. The scope of the invention is best determined by reference to the appended claims. Moreover, the same or similar elements in the drawings and the description are labeled with the same reference numbers.

Figure 1B:
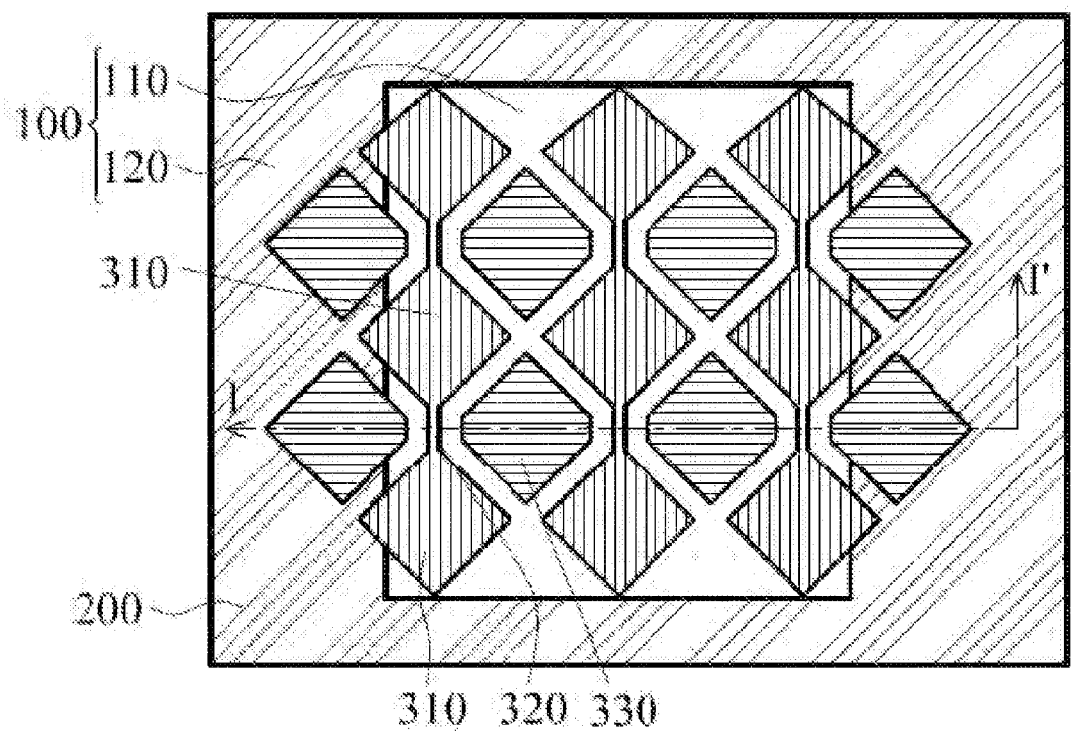
Figure 1C:
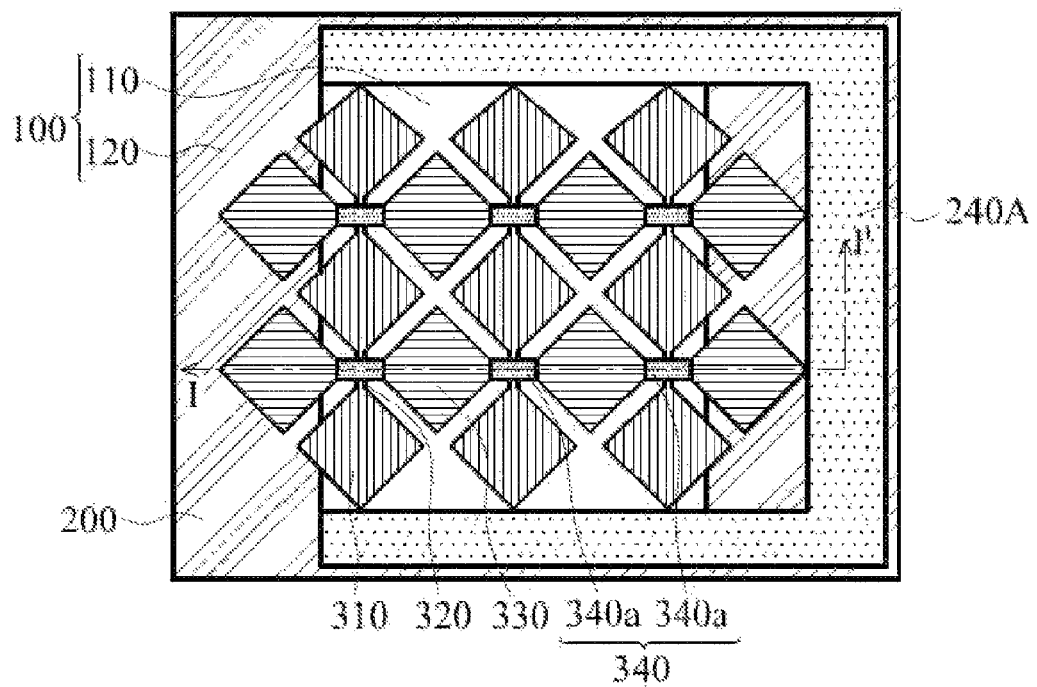
Figures 1, 1C:
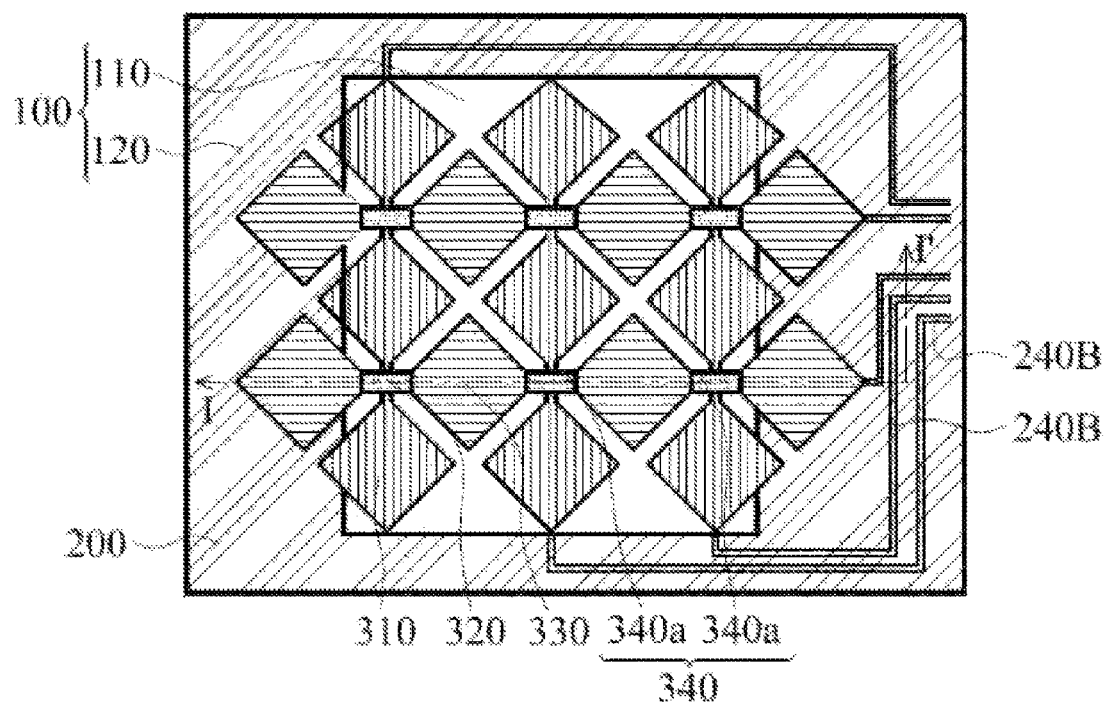
Figures 1, 1C, 2:
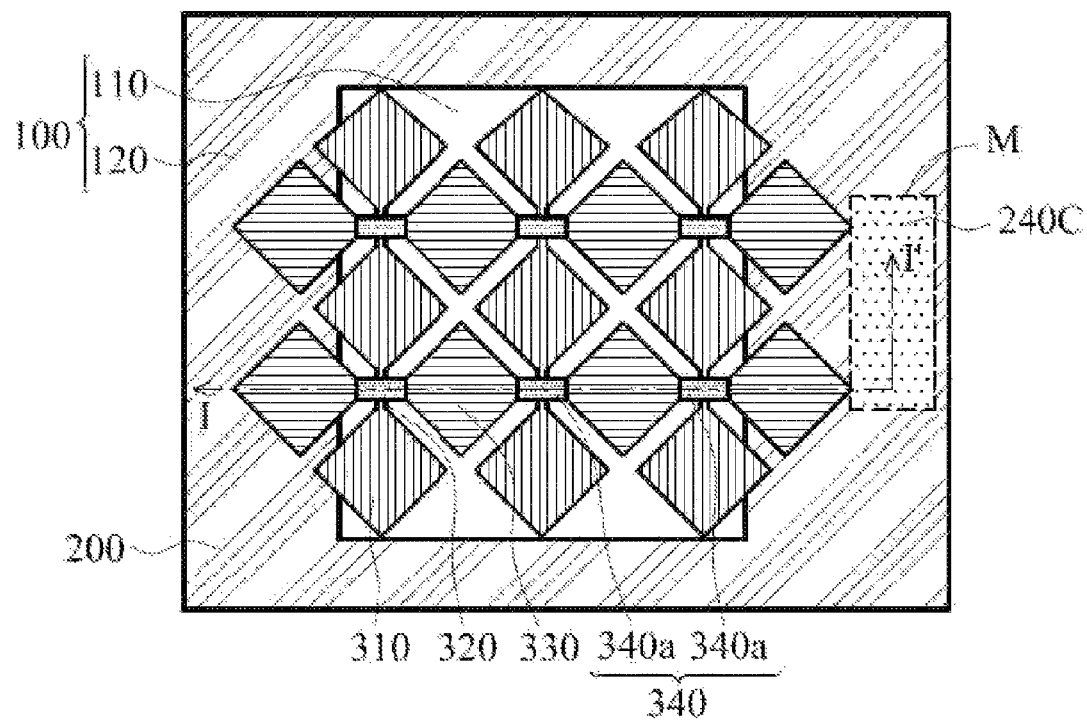
Figures 1, 1C, 2, 3:
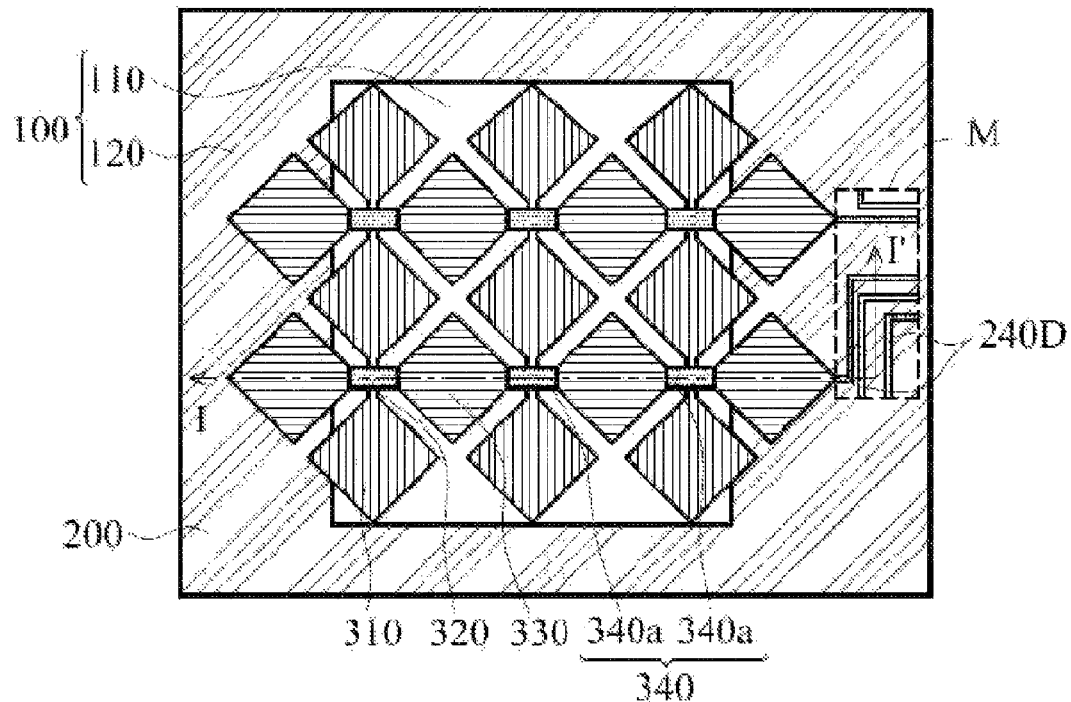
Figure 1D:
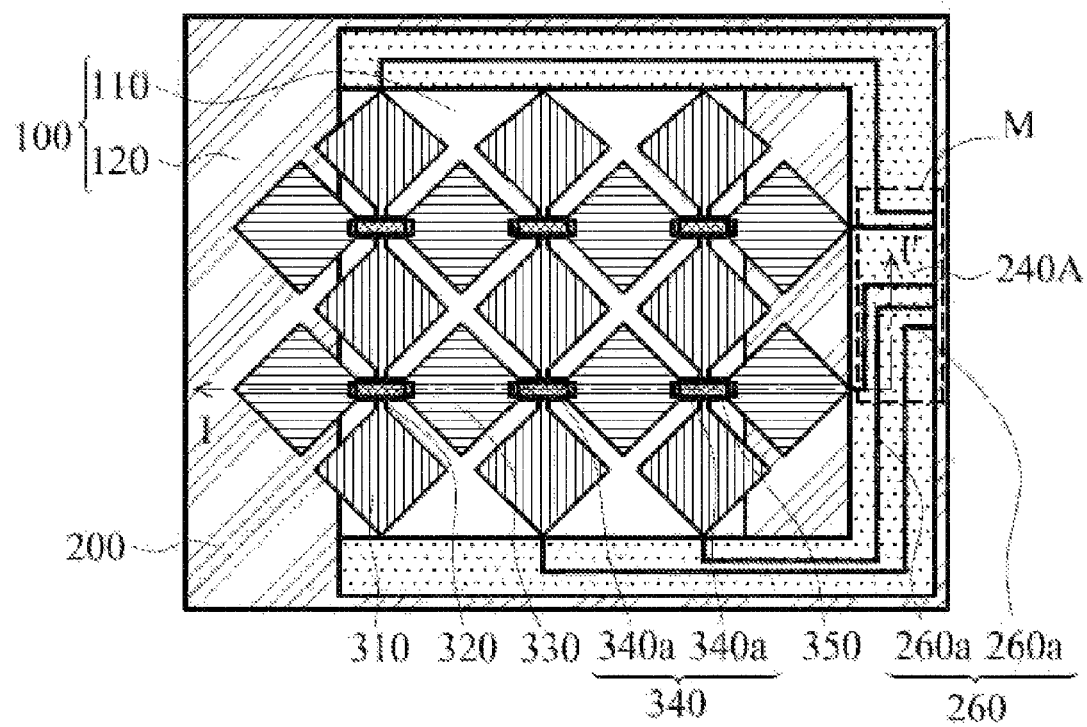
Figure 1E:
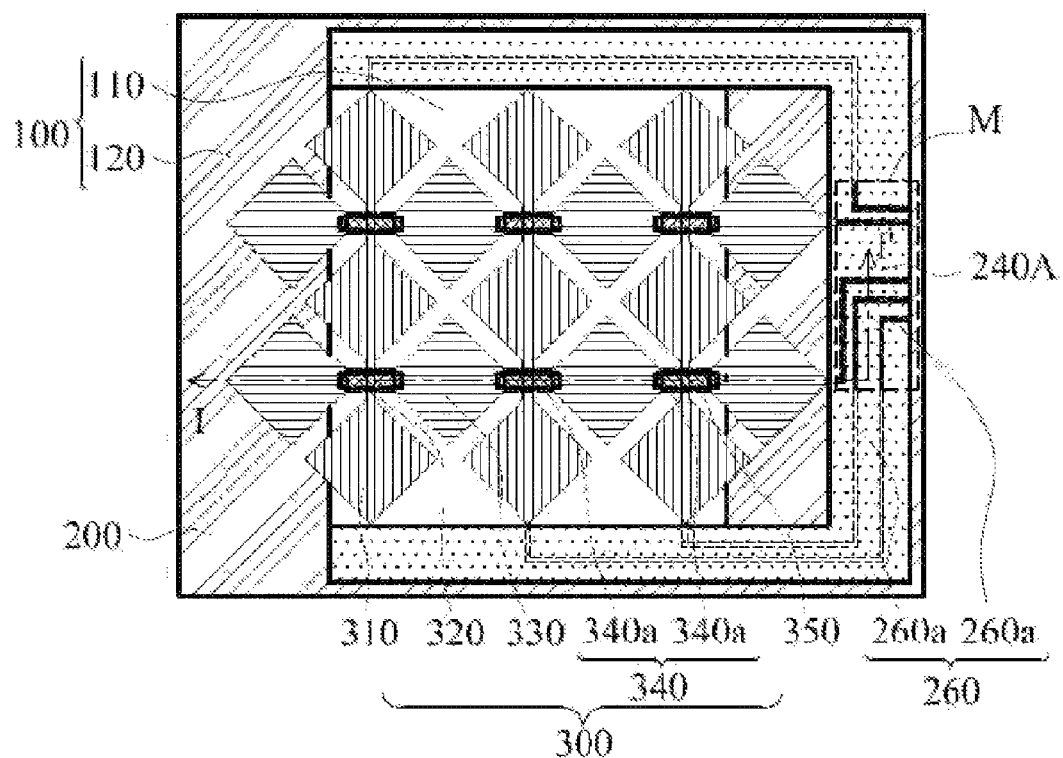
Figure 2A:
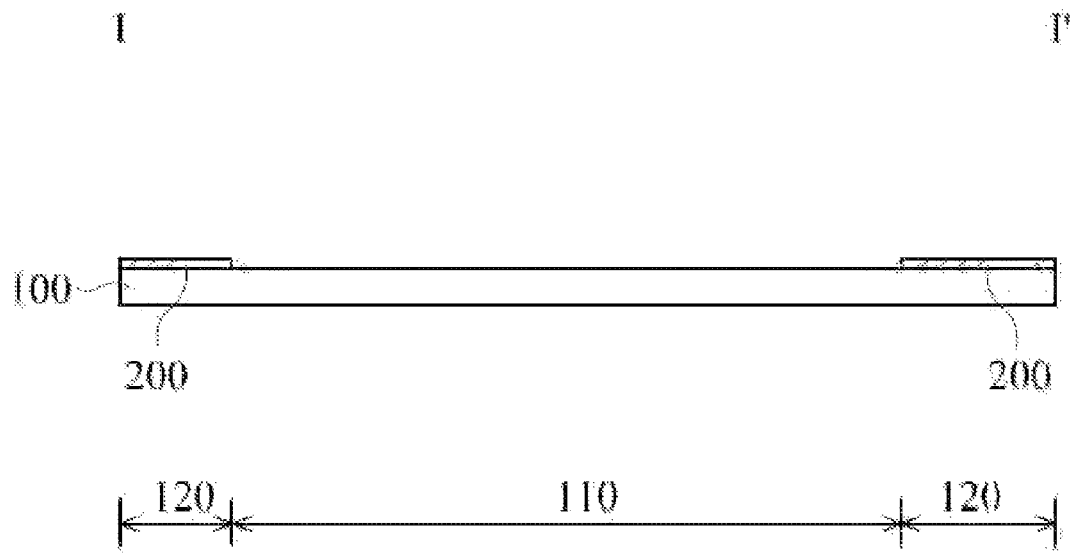
FIGS. 2A to 2E are cross-sectional views of an exemplary embodiment of a method for forming a structure of a touch panel along the line I-I' in FIGS. 1A to 1E according to the invention.
Figure 2B:
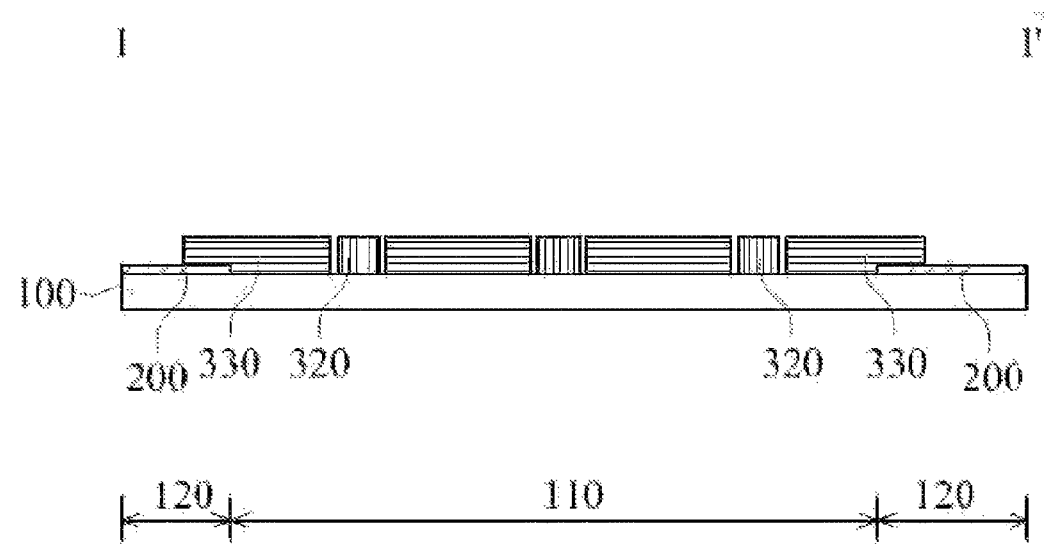
Figure 2C:
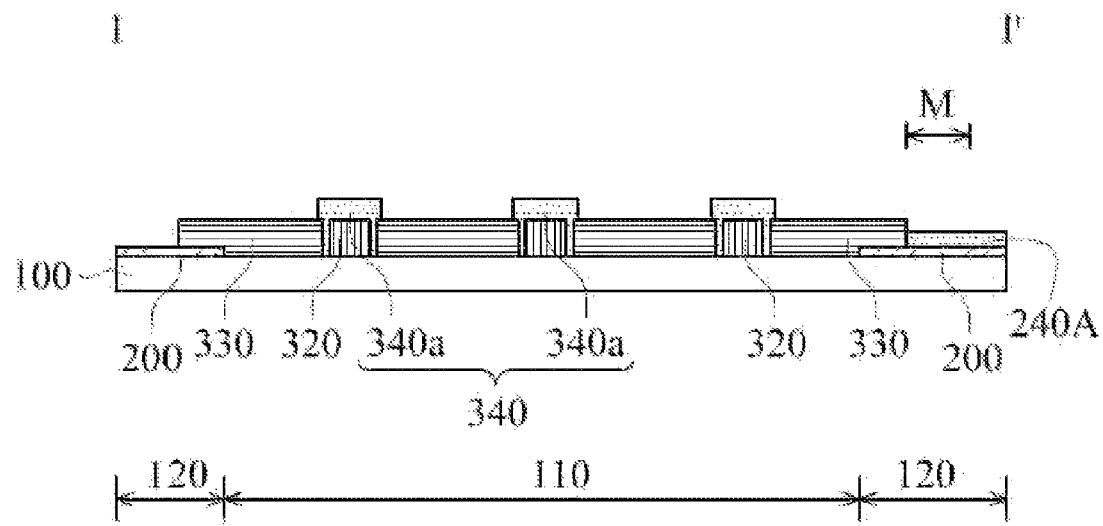
Figure 2D:
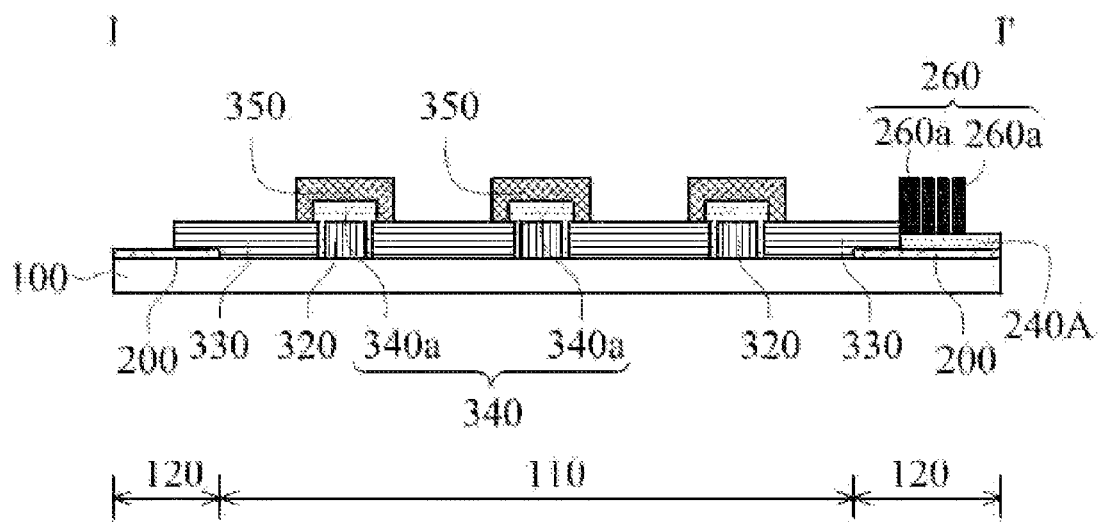
Figure 2E:
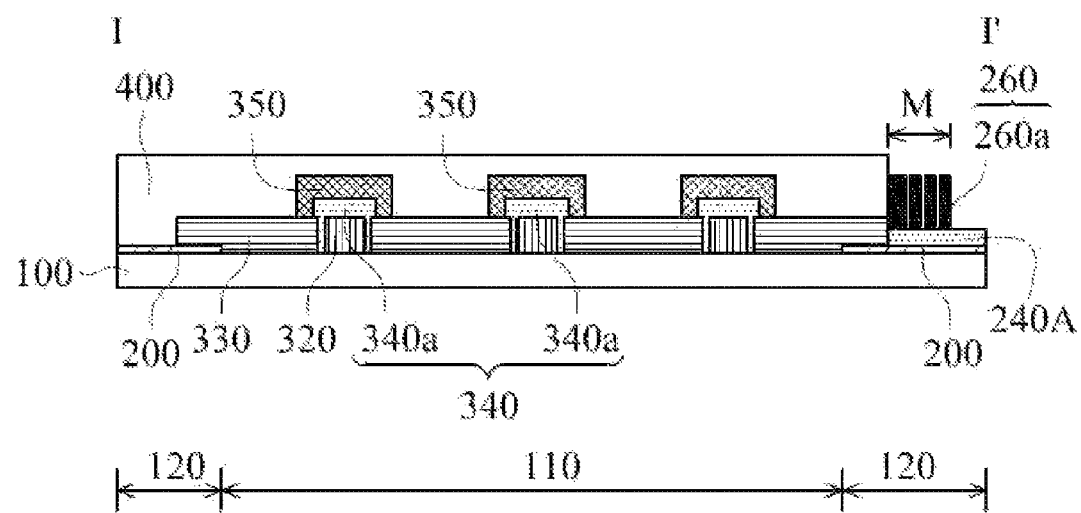

Referring to FIGS. 1E and 2E, wherein FIG. 1E is a plan view of an exemplary embodiment of a touch panel according to the invention and FIG. 2E is a cross-sectional view of the touch panel along the line I-I' in FIG. 1E. In the embodiment, the touch panel comprises a cover plate 100 having a viewing region 110 and a border region 120 surrounding the viewing region 110. At least one bonding region M is defined in the border region 120. A shielding layer 200 is disposed on the cover plate 100 corresponding to the border region 120. An adhesive pattern layer 240A is disposed on the shielding layer 200 corresponding to the bonding region M. A sensing electrode layer 300 is disposed on the cover plate 100 corresponding to the viewing region 110 and extends from the viewing region 110 to the shielding layer 200 corresponding to the border region 120. A signal trace layer 260 is disposed on the shielding layer 200. The signal trace layer 260 comprises a plurality of traces 260a, and each trace 260a has one end electrically connected to the sensing electrode layer 300 and another end assembled to the bonding region M.

The cover plate 100 may be made of glass material, polyethylene terephthalate (PET) or other transparent cover plate material well known in the art. Hard or flexible materials may be selected to form the cover plate 100. The cover plate 100 may be planar, curved or a combination thereof.

The shielding layer 200 may comprise a plurality of hollow portions (not shown), such as key marks of the common touch devices. In one embodiment, color layers may be formed on the hollow portions of the shielding layer 200 to satisfy the exterior demands of different key marks. The shielding layer 200 may be made of ink or photoresist materials.

In the embodiment, as shown in FIG. 1E, the adhesive pattern layer 240A is formed on the shielding layer 200 along partial edges of the border region 120. The adhesive pattern layer 240A may be made of insulating materials, such as polypropylene, polyimide, acrylic, silicon dioxide, silicon nitride ($Si_3N_4$), aluminum oxide ($Al_2O_3$), hexamethyldisilazane (HMDS), or combinations thereof.

In one embodiment, the adhesive pattern layer may be merely disposed on the shielding layer 200 corresponding to the bonding region M, such as an adhesive pattern layer 240C in FIG. 1C-2 or an adhesive pattern layer 240D in FIG. 1C-3.

In one embodiment, the traces 260a have a width equal to that of the underlying adhesive pattern layer. Namely, the traces 260a and the adhesive pattern layer have the same contour as viewed from a plan view perspective, such as the adhesive pattern layer 240B in FIG. 1C-1 or the adhesive pattern layer 240D in FIG. 1C-3. It is noted that it is ideal that each trace 260a has a width equal to that of the underlying adhesive pattern layer. In the actual products, each trace 260a may have a width less than that of the underlying adhesive pattern layer.

In particular, when the traces 260a have a width equal to or less than that of the underlying adhesive pattern layer, in addition to the above-mentioned insulating materials, the adhesive pattern layer may be made of a conductive material, such as indium tin oxide (ITO), indium zinc oxide, gallium indium tin oxide, nano carbon tube, nano silver line, or combinations thereof. It is easy to realize that since each trace 260a is electrically insulated from each other, the adhesive pattern layer formed under each trace 260a is also electrically insulated from each other when the adhesive pattern layer is made of a conductive material.

As shown in FIG. 1E, in the embodiment, the sensing electrode layer 300 is disposed on the cover plate 100 corresponding to the viewing region 110 and extends from the viewing region 110 to the shielding layer 200 corresponding to the border region 120 thereby ensuring that the, shielding layer 200 corresponding to the key marks are capable of executing touch sensing functions. In the embodiment, the sensing electrode layer 300 comprises a plurality of first axial electrodes arranged along a first direction and a plurality of second axial electrodes arranged along a second direction. Each first axial electrode comprises a plurality of first lumped electrode elements 310 and a plurality of connecting lines 320 connecting the first lumped electrode elements 310 which are adjacent to each other. Each second axial electrode comprises a plurality of second lumped electrode elements 330, wherein adjacent second lumped electrode elements 330 of the second axial electrode are disposed on both sides of the connecting line 320. A plurality of jumper lines 350 electrically connects the second lumped electrode elements 330 which are adjacent to each other. An insulating layer 340 is disposed between the connecting lines 320 and the jumper lines 350 to electrically insulate the connecting lines 320 and the jumper lines 350. In the embodiment, the insulating, layer 340 comprises a plurality of lumped insulating elements 340a, and each lumped insulating element 340a is disposed between the connecting lines 320 and the jumper lines 350. The first lumped electrode elements 310, the connecting lines 320 and the second lumped electrode elements 330 are made of transparent conductive materials, such as indium tin oxide, indium zinc oxide, nano carbon tube, nano silver line, grapheme, or combinations thereof. The jumper lines 350 may be made of metal materials, such as silver or copper, transparent conductive materials, such as indium tin oxide, or combinations thereof. The insulating layer 340 may comprise the same insulating material as that of the adhesive pattern layer 240A, and therefore the insulating layer 340 and the adhesive pattern layer 240A may be formed simultaneously. In another embodiment, the sensing electrode layer 300 may have other electrode structures, such as an electrode structure without jumpers shown in FIG. 9.

The traces 260a of the signal trace layer 260 may be made of metal materials, such as copper, silver or aluminum, transparent conductive materials, such as indium tin oxide, or combinations thereof. Namely, the traces 260a may comprise the same material as that of the jumper lines 350. In addition, it is illustrated that the number and position of the bonding region M may be adjusted according to the shape and size of the sensing electrode layer 300 and the number of the trace 260a, and is not limited to that which is shown in figures.

Referring to FIGS. 1E and 2E, a protective layer 400 is disposed on the cover plate 100 and covers the shielding layer 200, the sensing electrode layer 300, and portions of the signal trace layer 260. It is illustrated that contours of portions of the traces 260a and the sensing electrode layer 300 are shown by dotted lines in FIG. 1E so as to illustrate that the portions are covered by the protective layer 400. The position of the protective layer 400 is also shown in FIG. 2E. The illustrated feature of the protective layer is used as an example for the following embodiments and will not be described again. The protective layer 400 may be made of silicon oxide or photoresist. The protective layer 400 exposes the traces 260*a* in the bonding region M in order to subsequently bond the traces 260*a* in the bonding region M onto the flexible circuit board by the conductive glue (not shown). In addition, the protective layer 400 not only protects the touch structure but also improves the problem of the traces 260*a* easily peeling off the shielding layer 200.

Figure 3A:
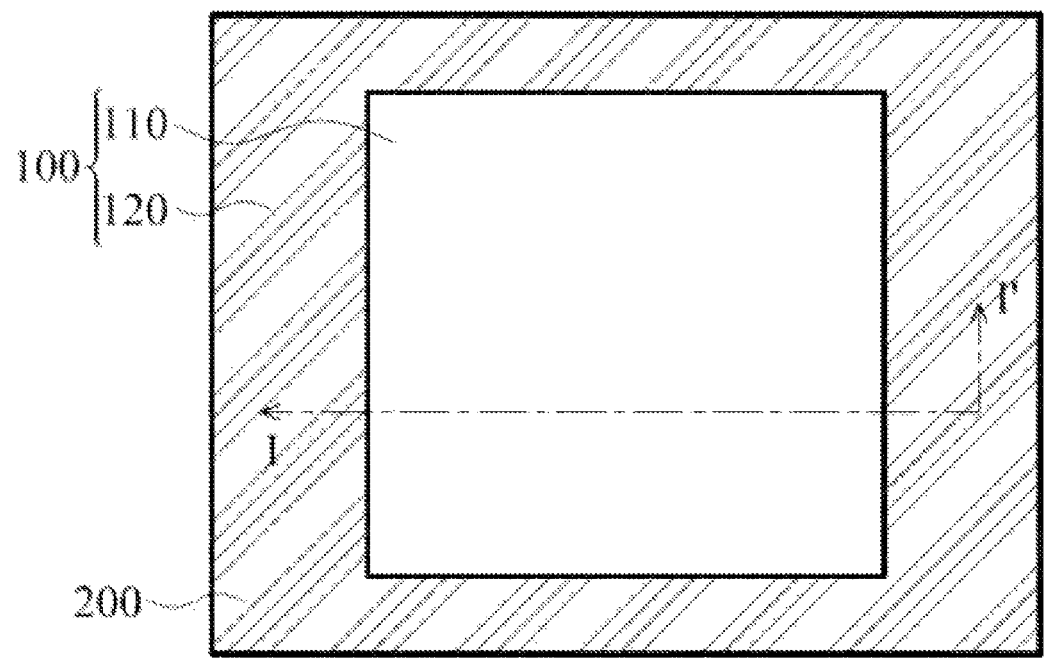
FIGS. 3A to 3E are plan views of another exemplary embodiment of a method for forming a structure of a touch panel according to the invention.
Figure 3B:
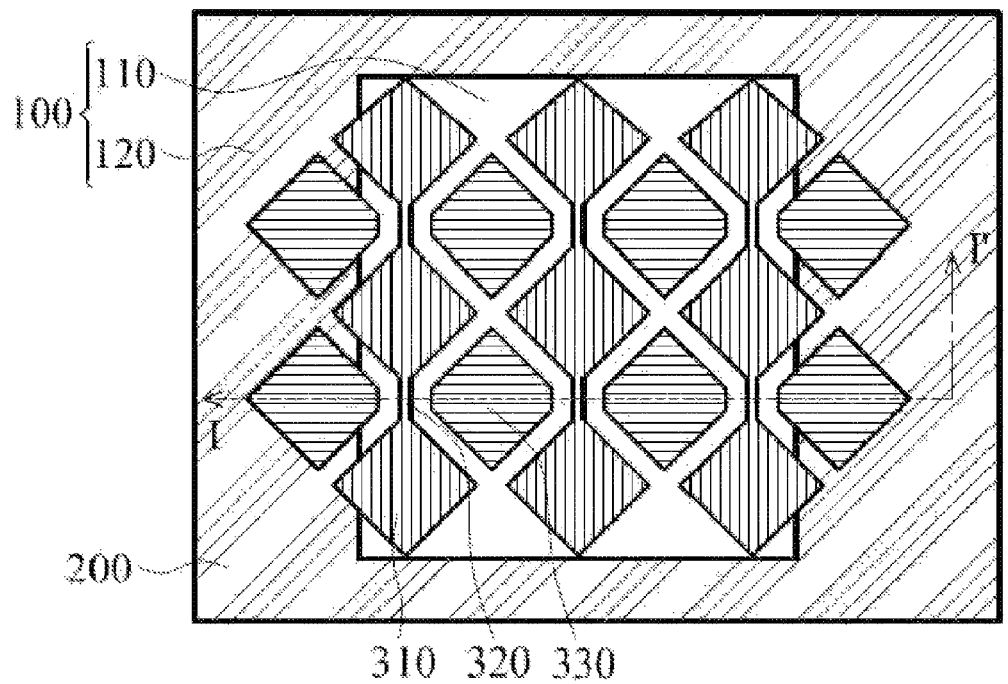
Figure 3C:
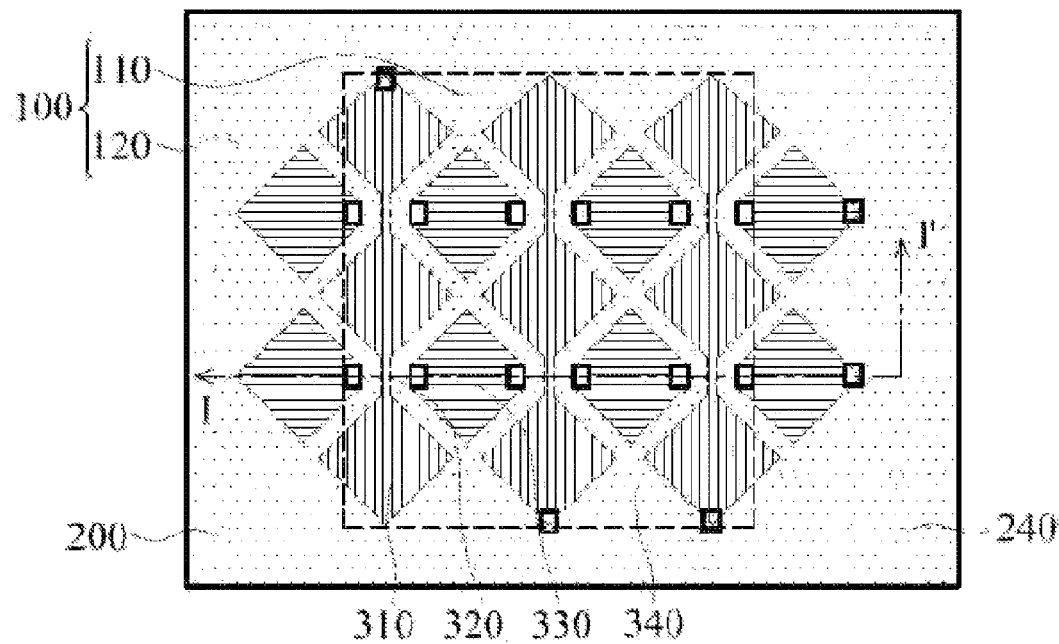
Figure 3D:
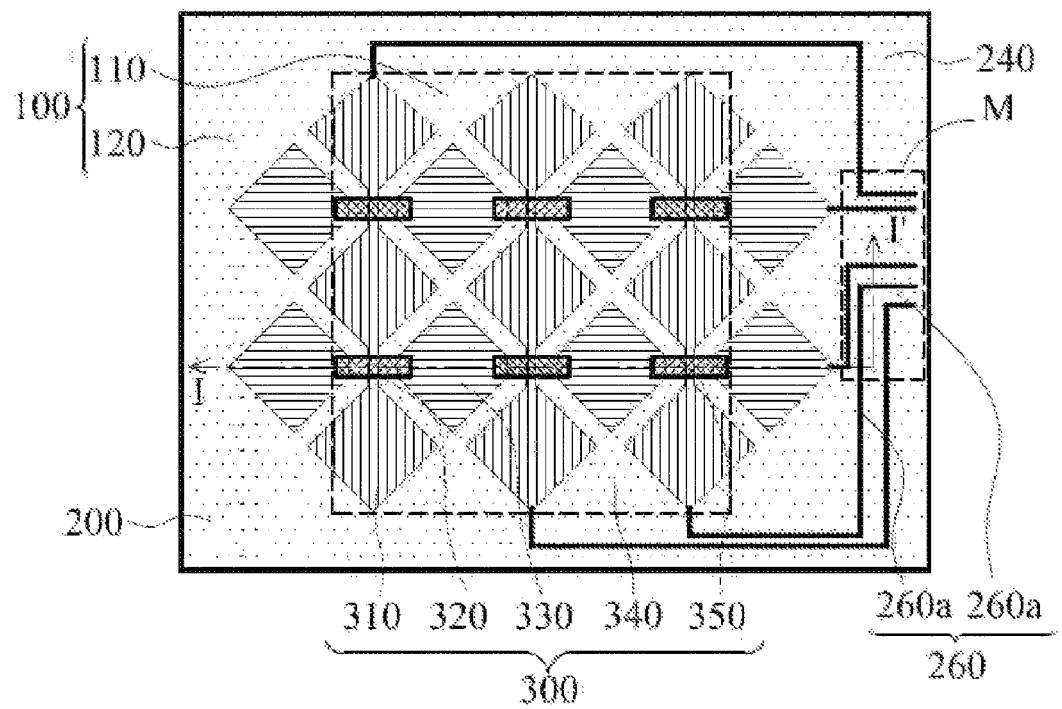
Figure 3E:
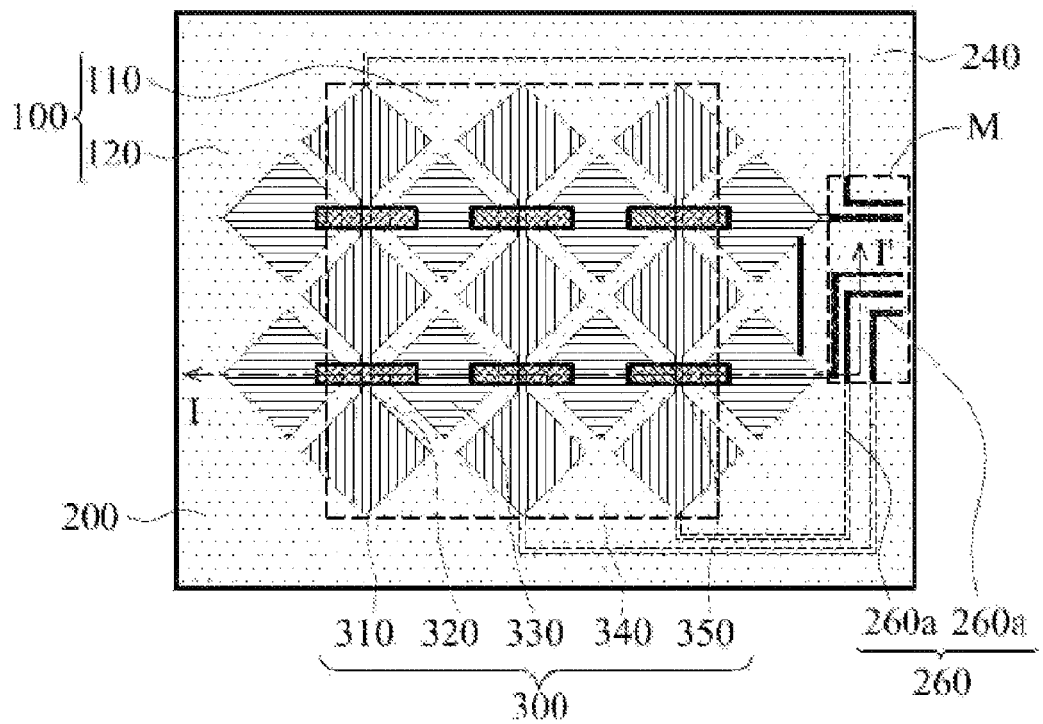
Figure 4A:
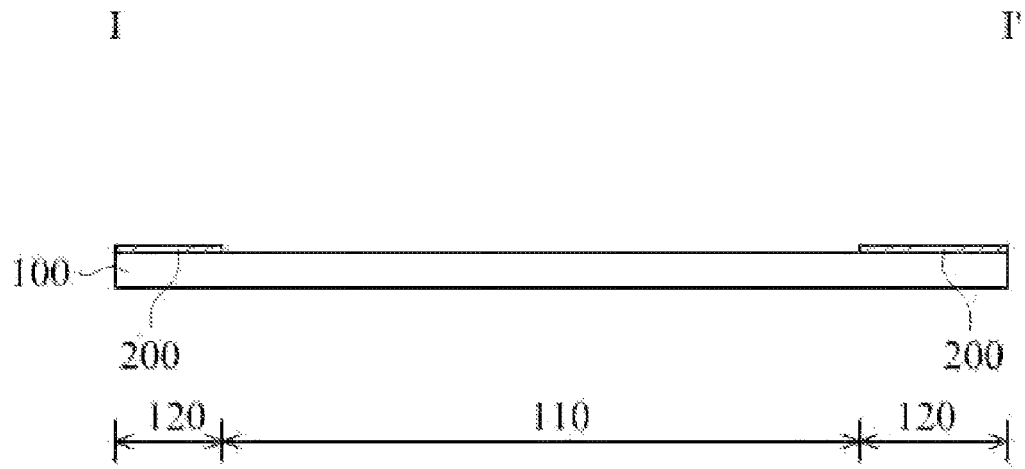
FIGS. 4A to 4E are cross-sectional views of another exemplary embodiment of a method for forming a structure of a touch panel along the line I-I' in FIGS. 3A to 3E according to the invention.
Figure 4B:
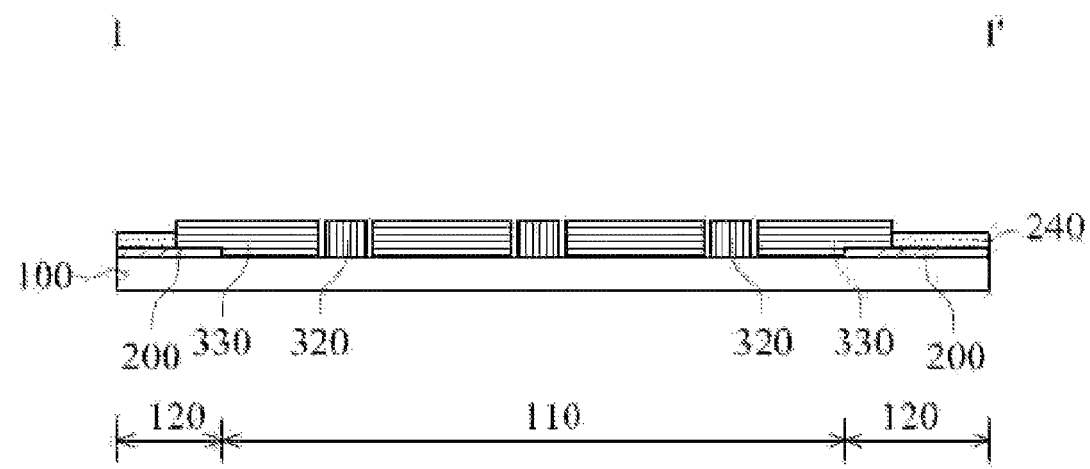
Figure 4C:
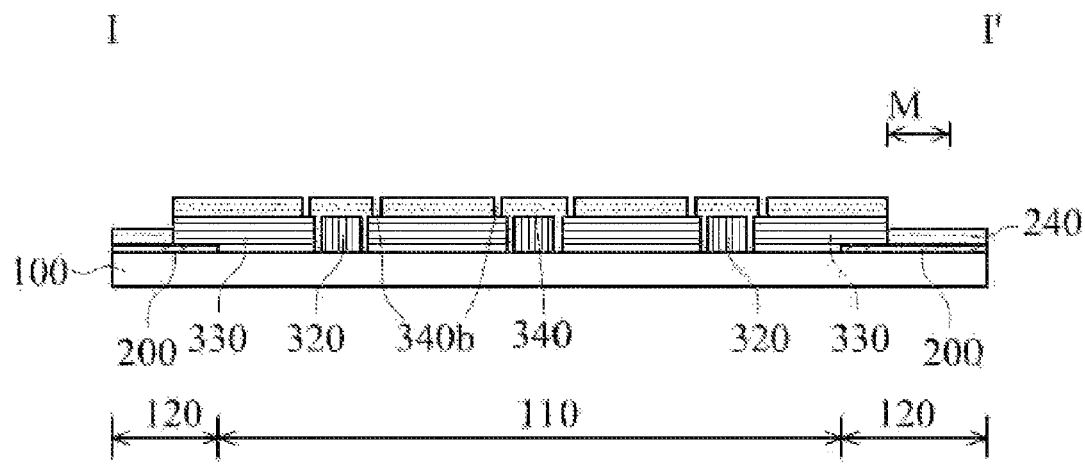
Figure 4D:
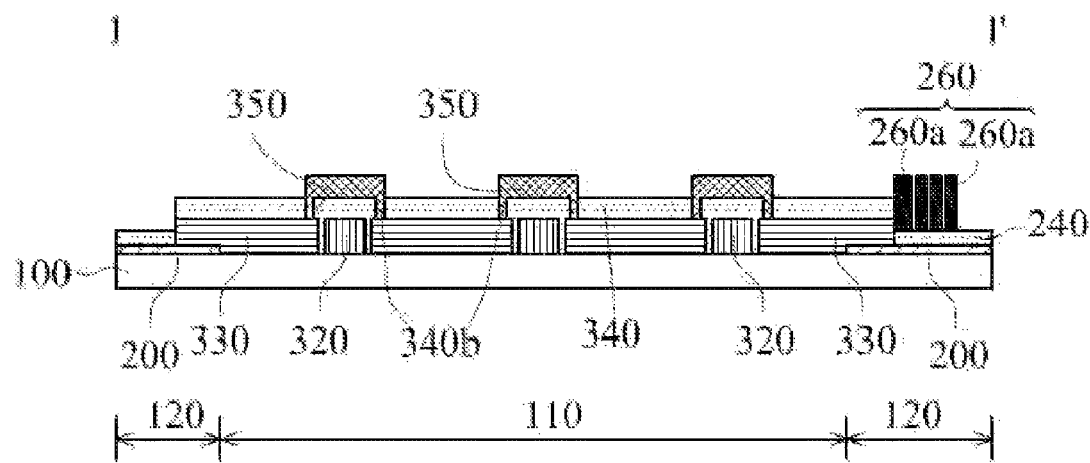
Figure 4E:
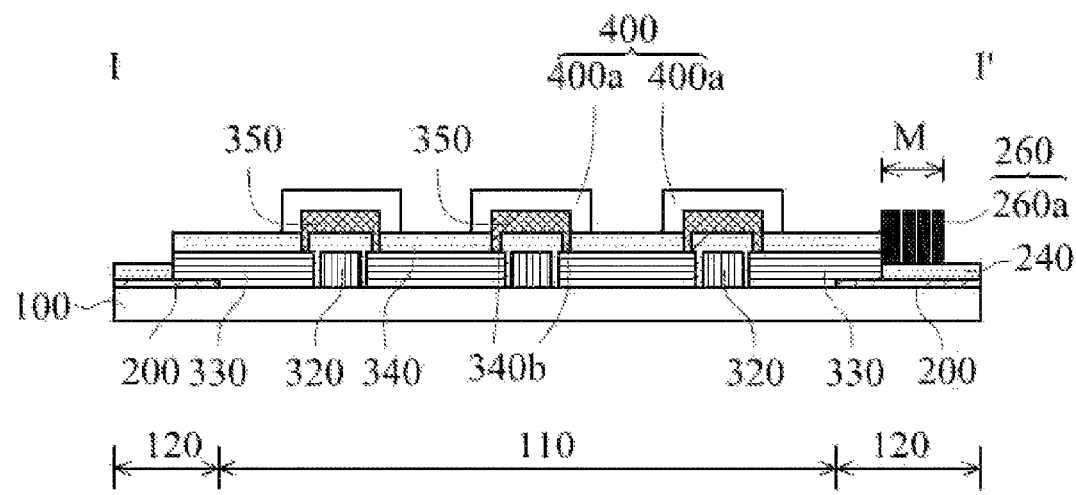

Referring to FIGS. 3E and 4E, wherein FIG. 3E is a plan view of another exemplary embodiment of a touch panel according to the invention and FIG. 4E is a cross-sectional view of the touch panel along the line I-I' in FIG. 3E. Elements in FIGS. 3E and 4E that are the same as those in FIGS. 1E and 2E are labeled with the same reference numbers as in FIGS. 1E and 2E and are not described again for brevity. In the embodiment, the touch panel structure is similar to that in FIGS. 1E and 2E, and the difference therebetween is that the adhesive pattern layer 240 corresponding to the border region 120 extends to the entire viewing region 110. Namely, the insulating layer 340 and the adhesive pattern layer 240 comprise the same insulating material and are formed in the same step. Hollows 340*b* are formed in the insulating layer 340 corresponding to the second lumped electrode elements 330. The jumper lines 350 are electrically connected to the second lumped electrode elements 330, which are adjacent to each other, through the hollows 340*b*. The traces 260*a* are also electrically connected to the first lumped electrode elements 310 or the second lumped electrode elements 330 through the hollows 340*b*. Moreover, the protective layer 400 further comprises a plurality of lumped protective elements 400*a* spaced apart from each other and correspondingly disposed on the jumper lines 350 corresponding to the viewing region 110 and the traces 260*a* corresponding to the border region 120. Same as that of the aforementioned embodiment, the traces 260*a* corresponding to the bonding region M is not covered by the protective layer 400. Other features of the touch panel structure in the embodiment are the same as that of the aforementioned embodiment, and so the description is omitted herein for brevity.

Figure 5A:
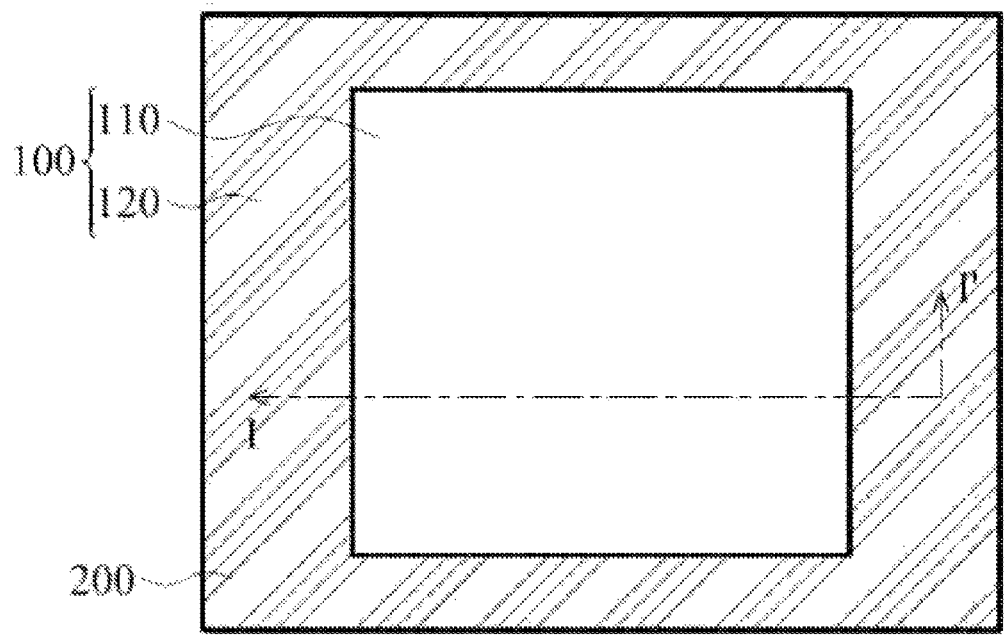
FIGS. 5A to 5E are plan views of yet another exemplary embodiment of a method for forming a structure of a touch panel according to the invention.
Figure 5B:
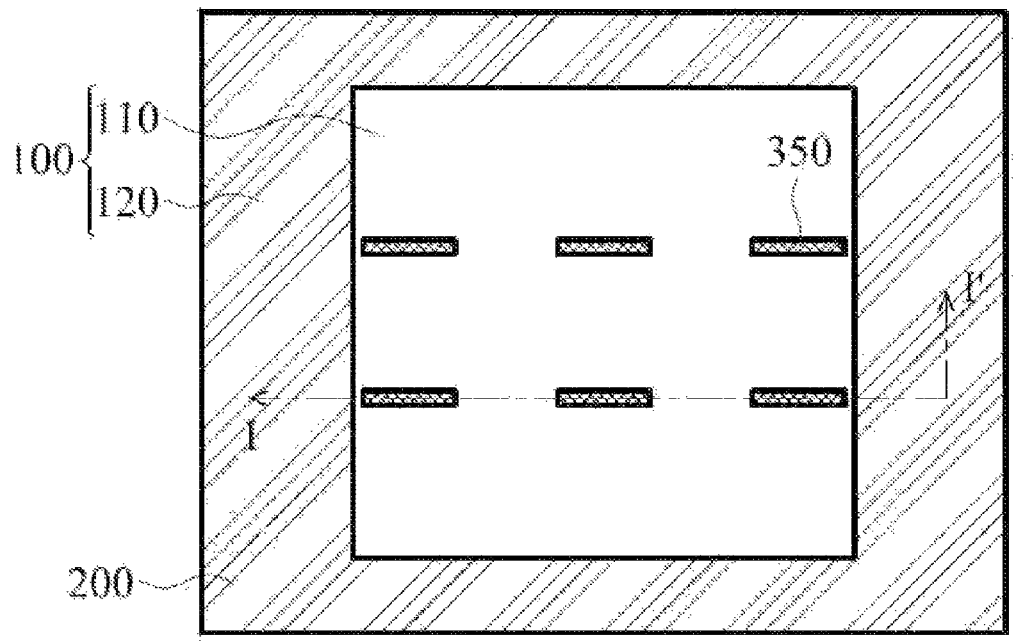
Figure 5C:
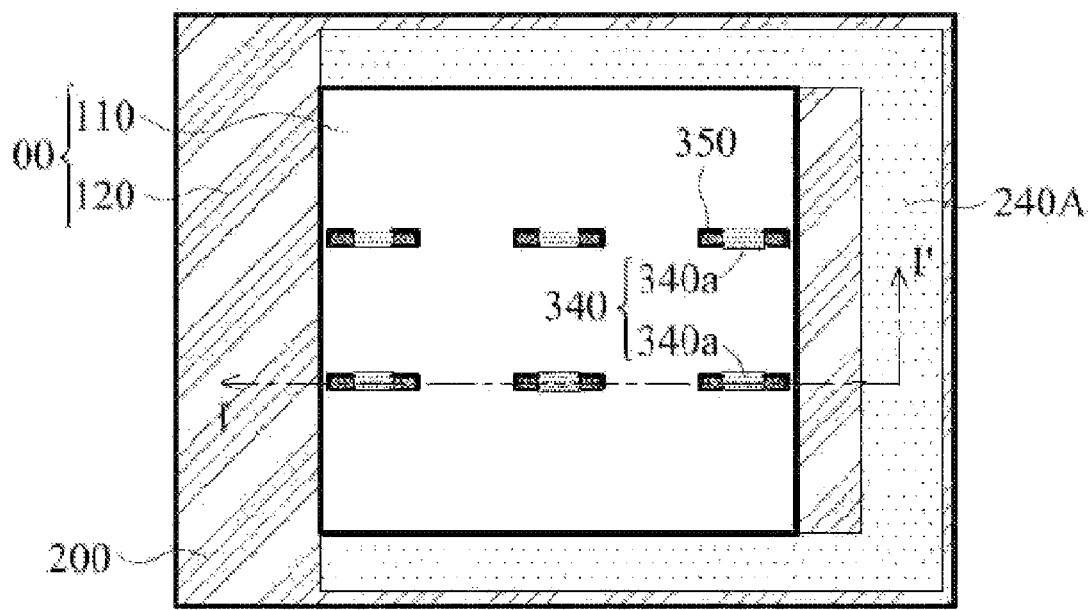
Figures 1, 5C:
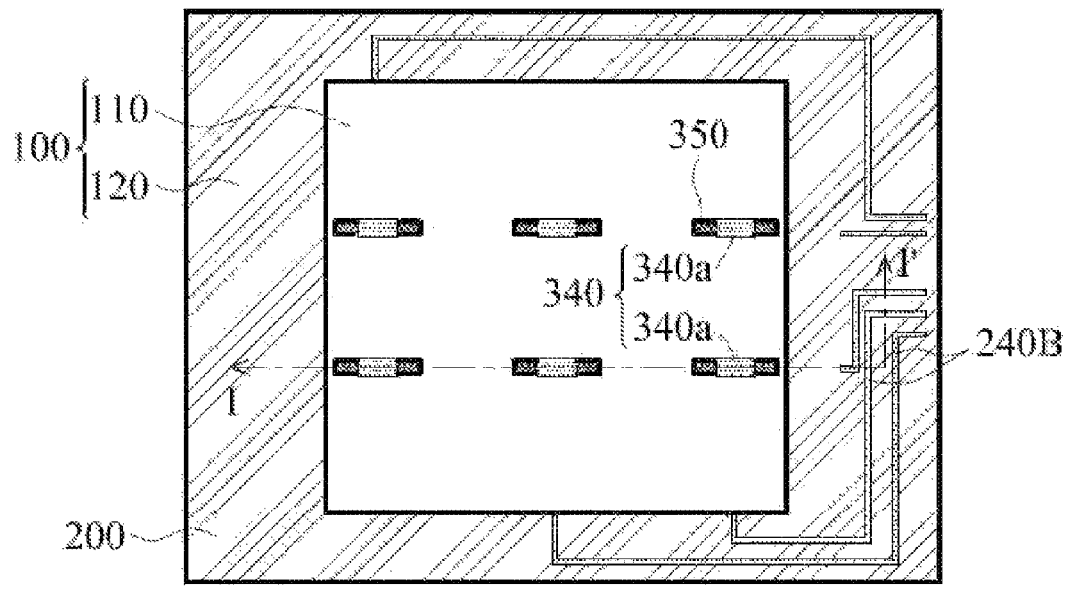
Figures 2, 5C:
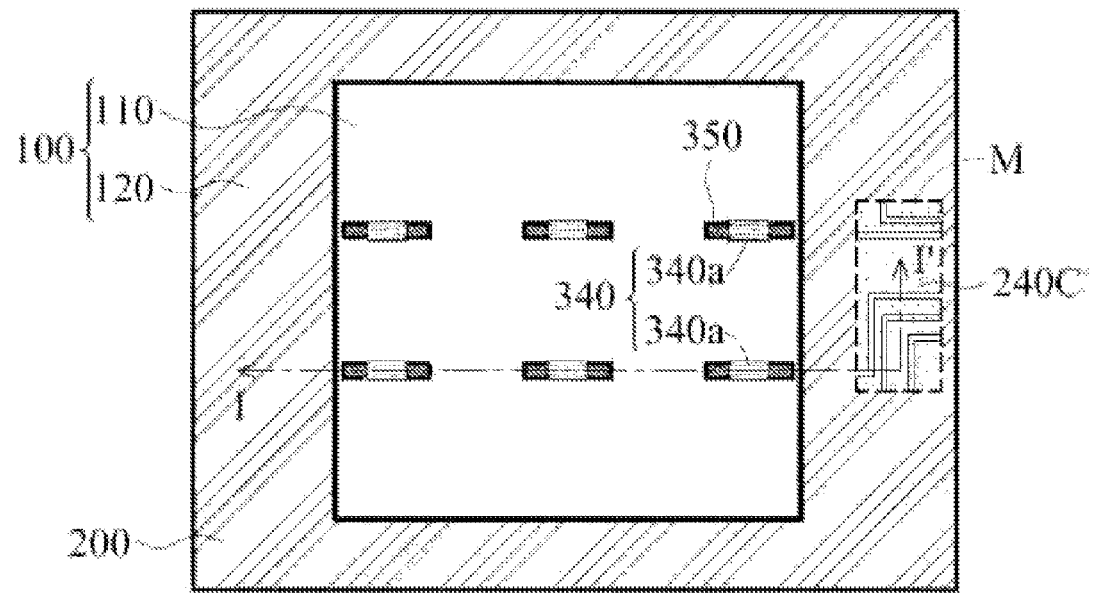
Figures 3, 5C:
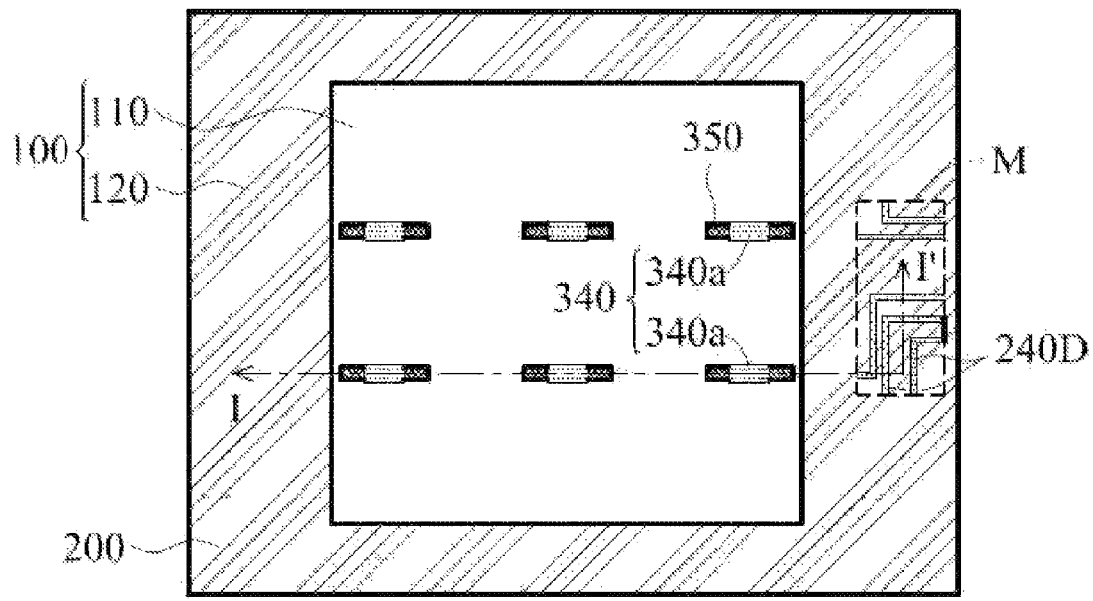
Figure 5D:
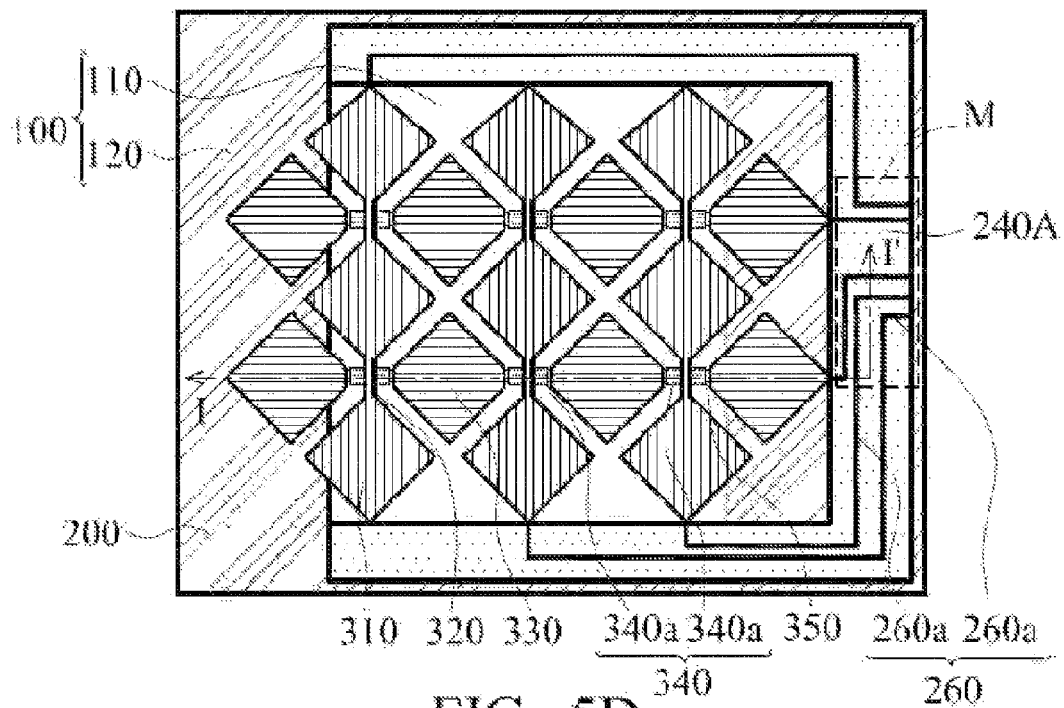
Figure 5E:
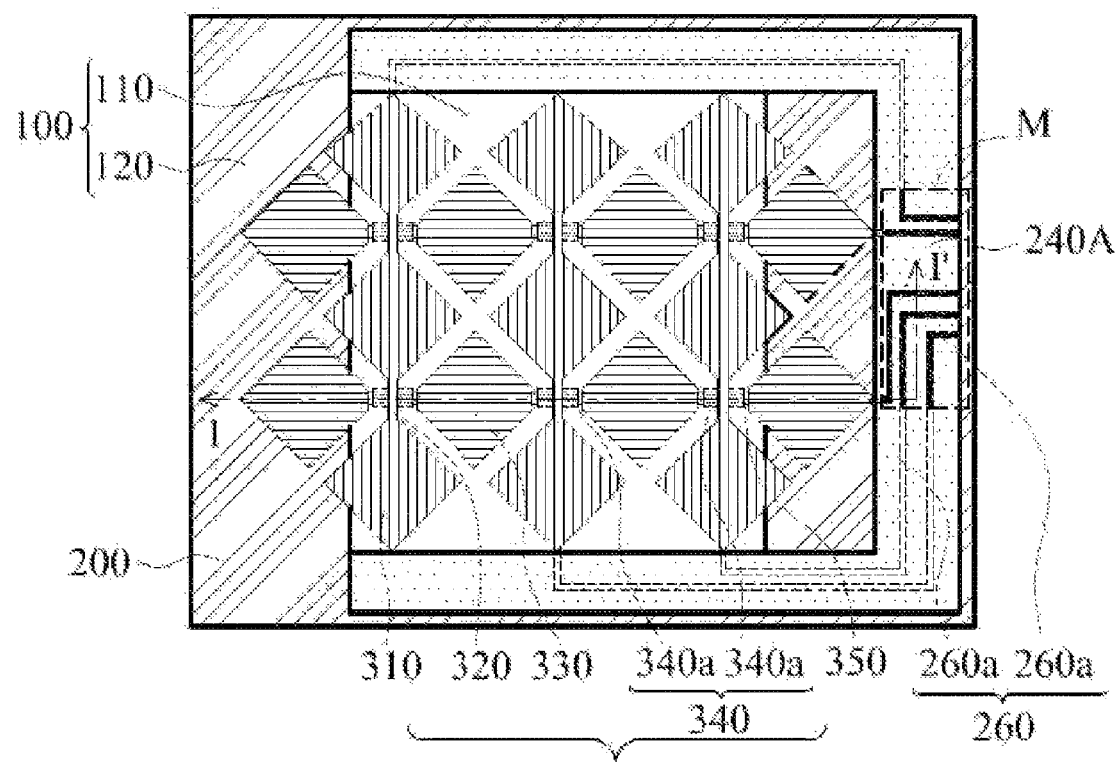
Figure 6A:
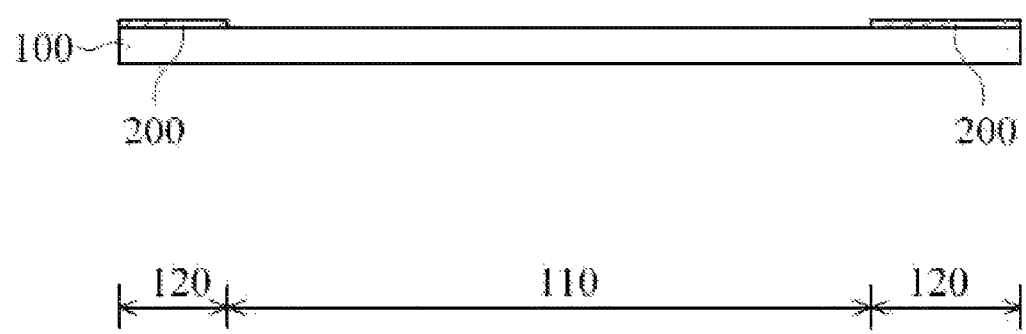
FIGS. 6A to 6E are cross-sectional views of yet another exemplary embodiment of a method for forming a structure of a touch panel along the line I-I' in FIGS. 5A to 5E according to the invention.
Figure 6B:
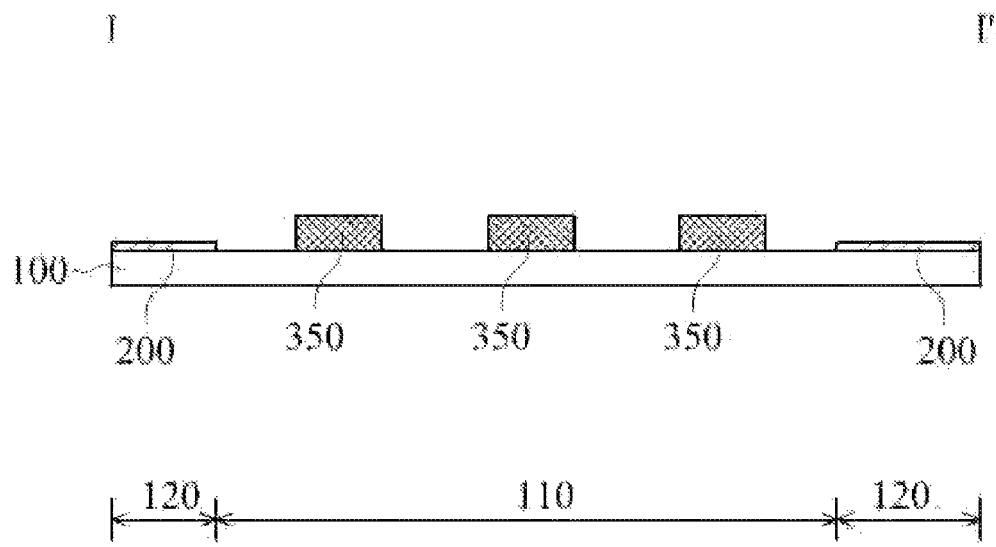
Figure 6C:
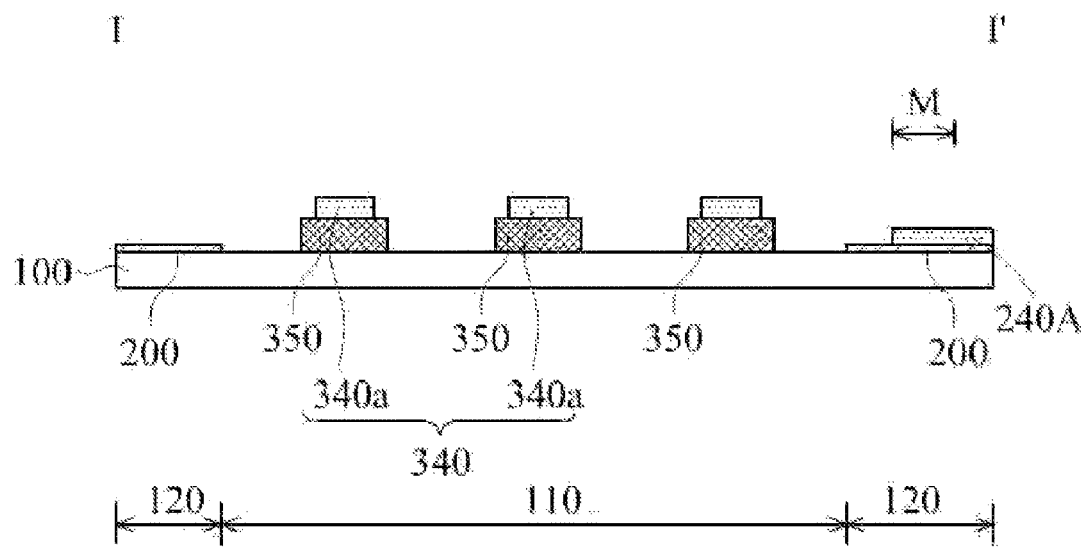
Figure 6D:
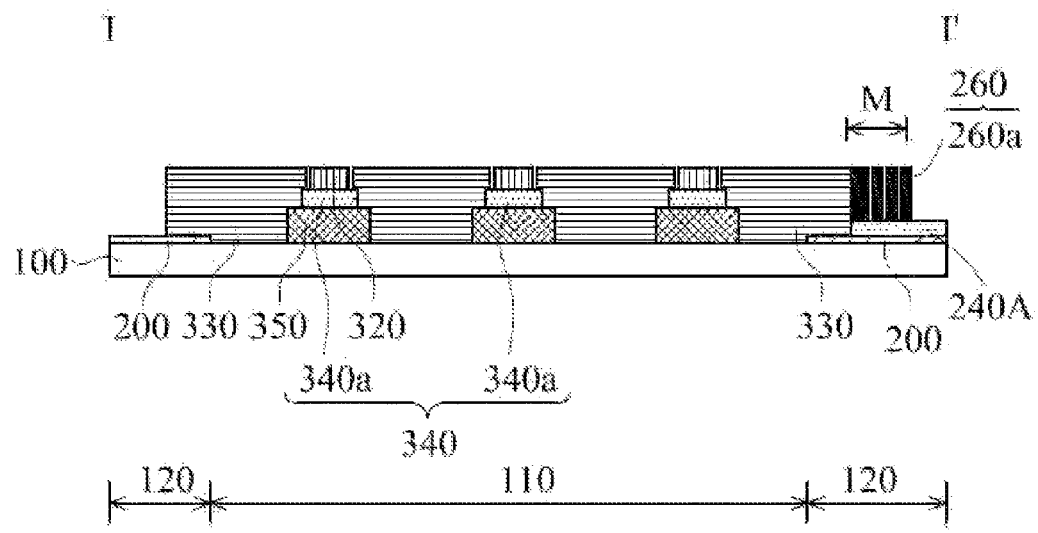
Figure 6E:
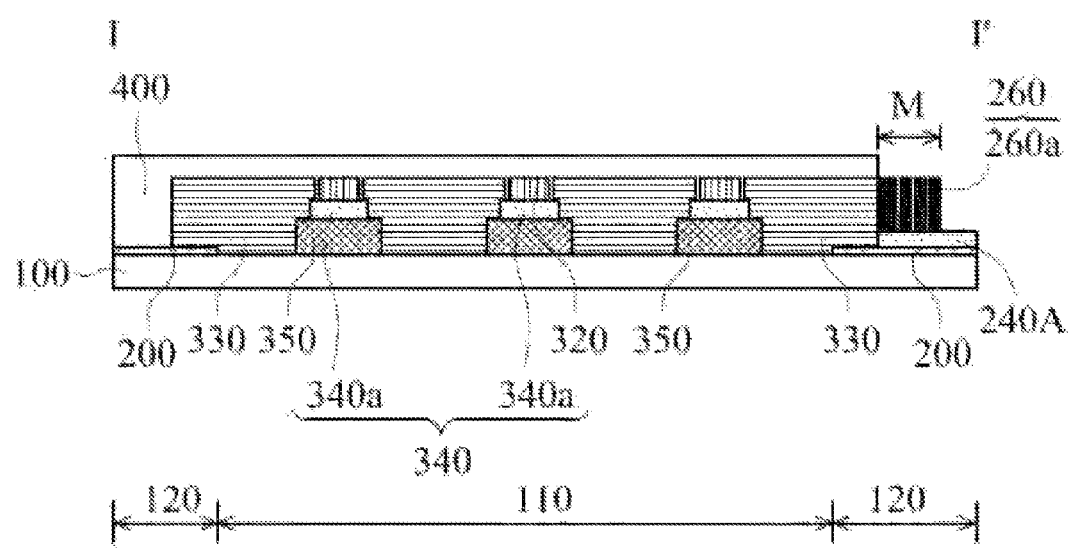

Referring to FIGS. 5E and 6E, wherein FIG. 5E is a plan view of yet another exemplary embodiment of a touch panel according to the invention and FIG. 6E is a cross-sectional view of the touch panel along the line I-I' in FIG. 5E. Elements in FIGS. 5E and 6E that are the same as those in FIGS. 1E and 2E are labeled with the same reference numbers as in FIGS. 1E and 2E and are not described again for brevity. In the embodiment, the touch panel structure is similar to that in FIGS. 1E and 2E, and the difference there between is that the positions of the jumper lines 350, the first lumped electrode elements 310, the connecting lines 320 and the second lumped electrode elements 330 of the sensing electrode layer 300 are changed with respect to the cover plate 100. More specifically, the jumper lines 350 are correspondingly disposed on the cover plate 100. The lumped insulating elements 340*a* of the insulating layer 340 are disposed on the jumper lines 350. The first lumped electrode elements 310 and plurality of the second lumped electrode elements 330 are on the cover plate 100 in a staggered arrangement. The first lumped electrode elements 310, which are adjacent to each other, are electrically connected to each other by the connecting lines 320 disposed on the lumped insulating elements 340*a*. The second lumped electrode elements 330, which are adjacent to each other, are electrically connected to each other by the jumper lines 350. Other features of the touch panel structure in the embodiment are the same as those of the first embodiment, and so the description is omitted herein for brevity.

Figure 7A:
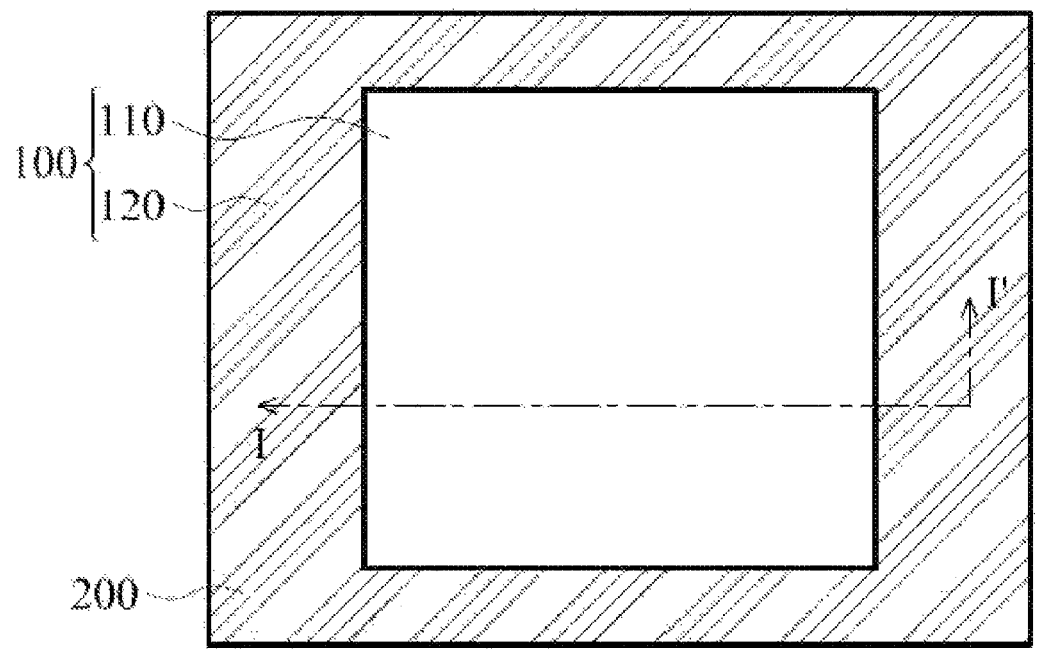
FIGS. 7A to 7E are plan views of yet another exemplary embodiment of a method for forming a structure of a touch panel according to the invention.
Figure 7B:
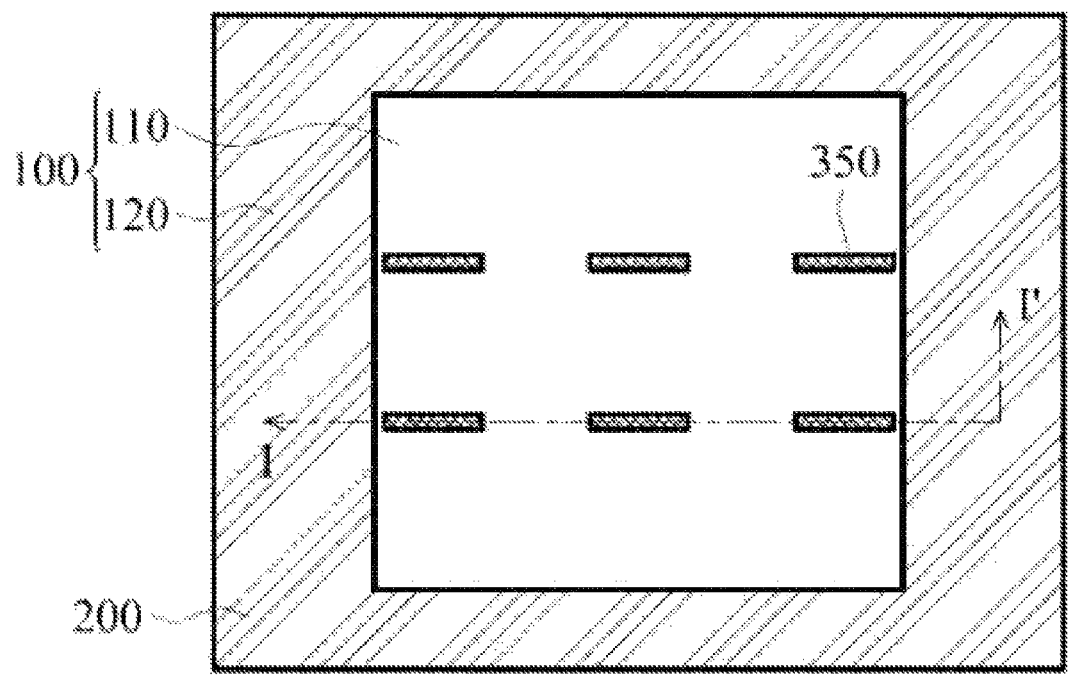
Figure 7C:
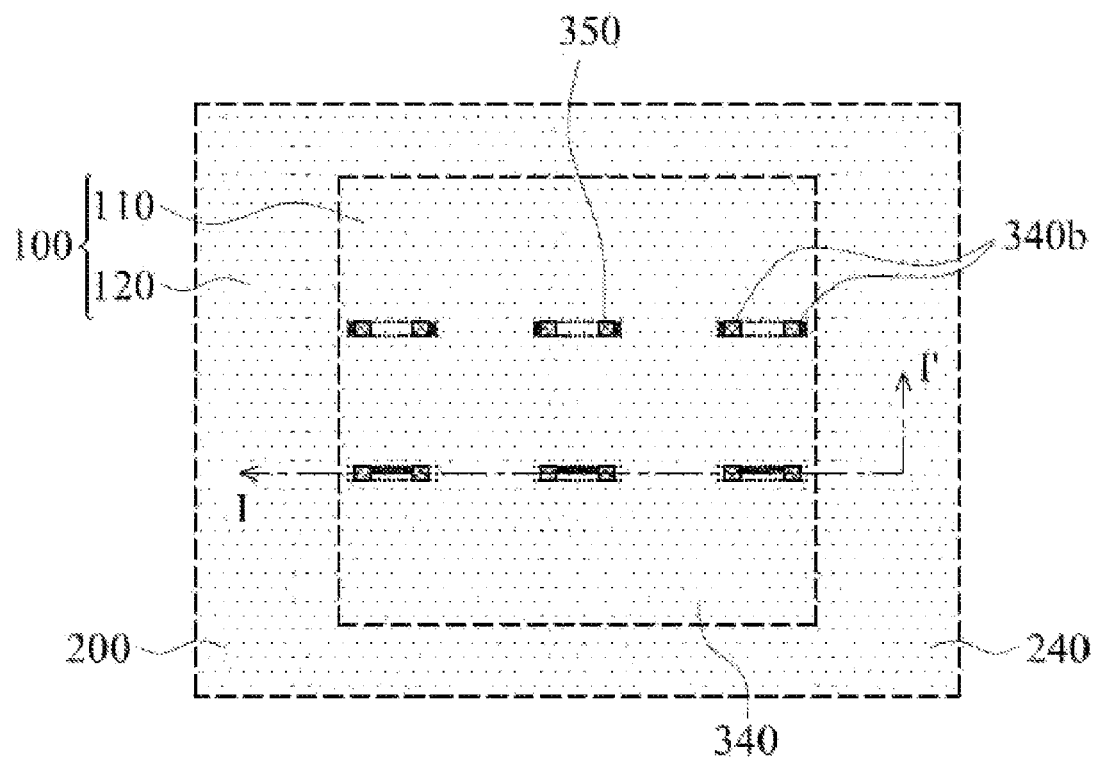
Figure 7D:
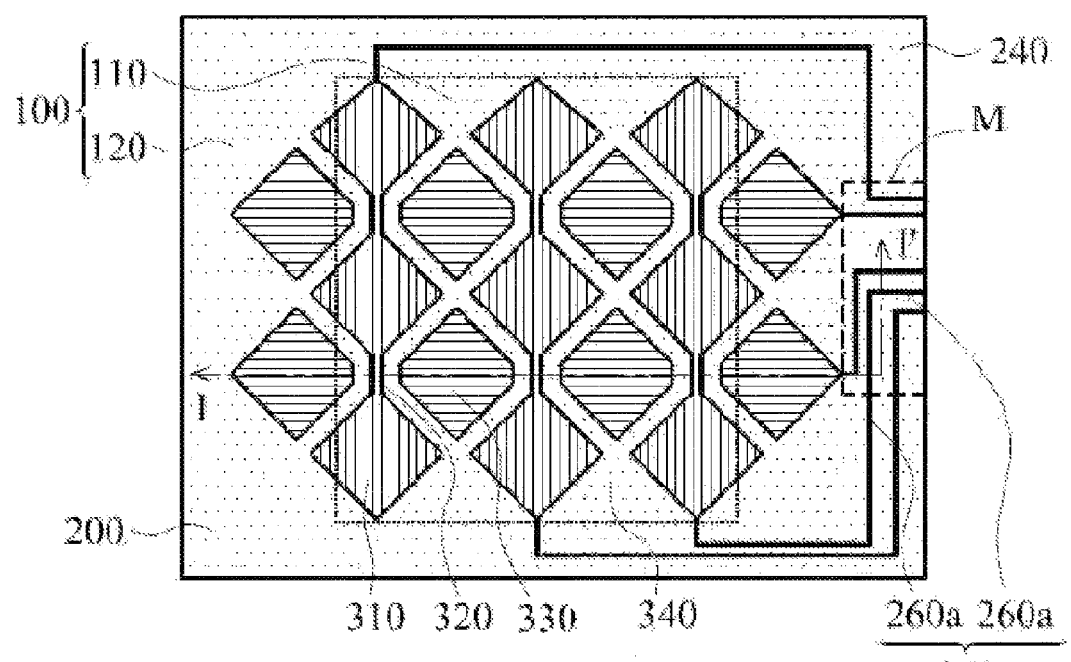
Figure 7E:
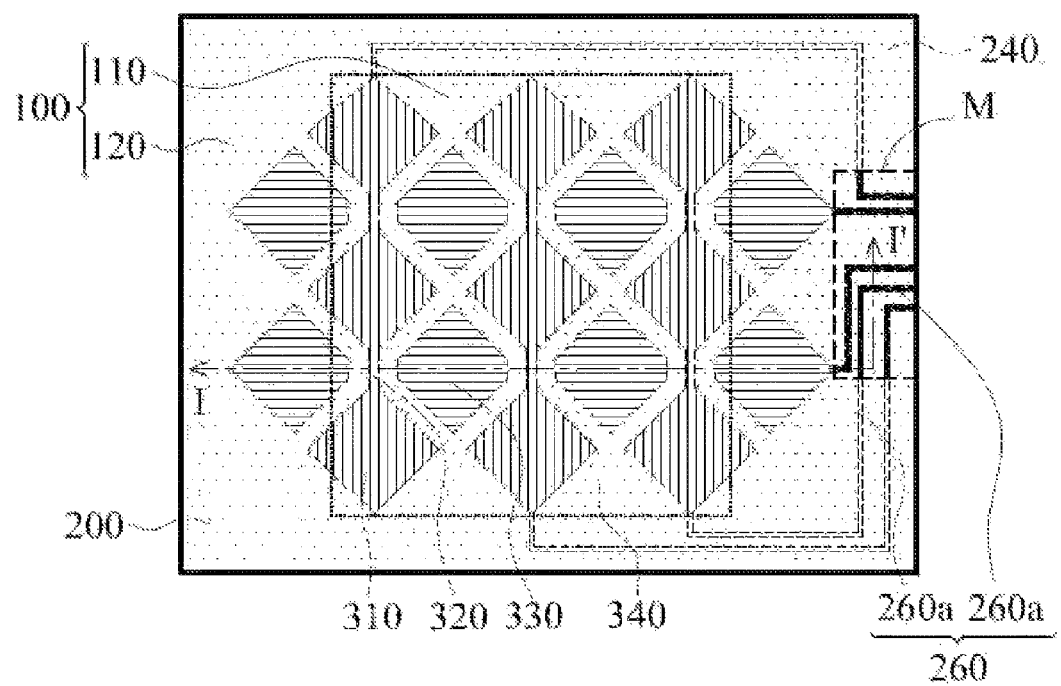
Figure 8A:
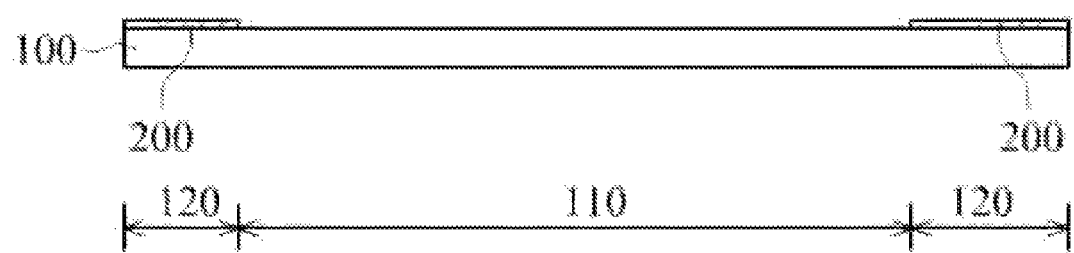
FIGS. 8A to 8E are cross-sectional views of yet another exemplary embodiment of a method for forming a structure of a touch panel along the line I-I' in FIGS. 7A to 7E according to the invention.
Figure 8B:
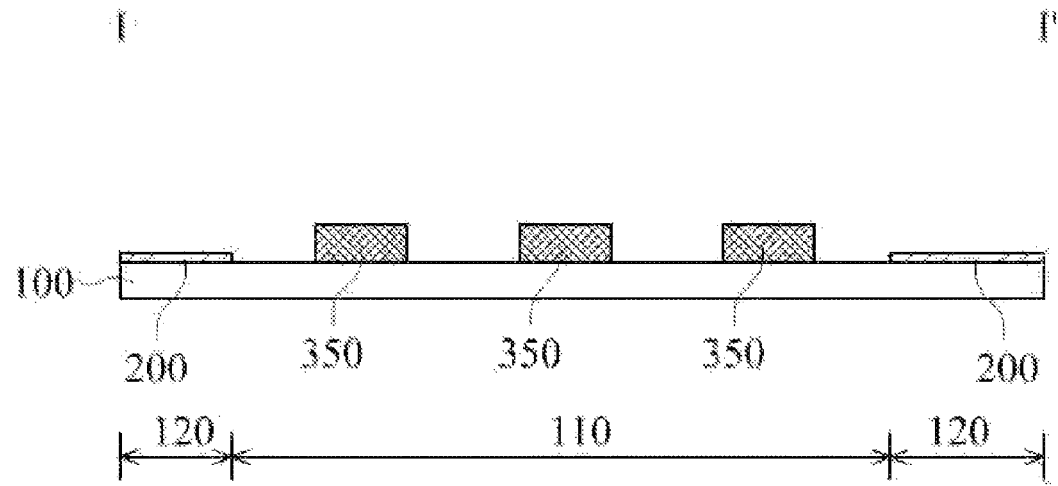
Figure 8C:
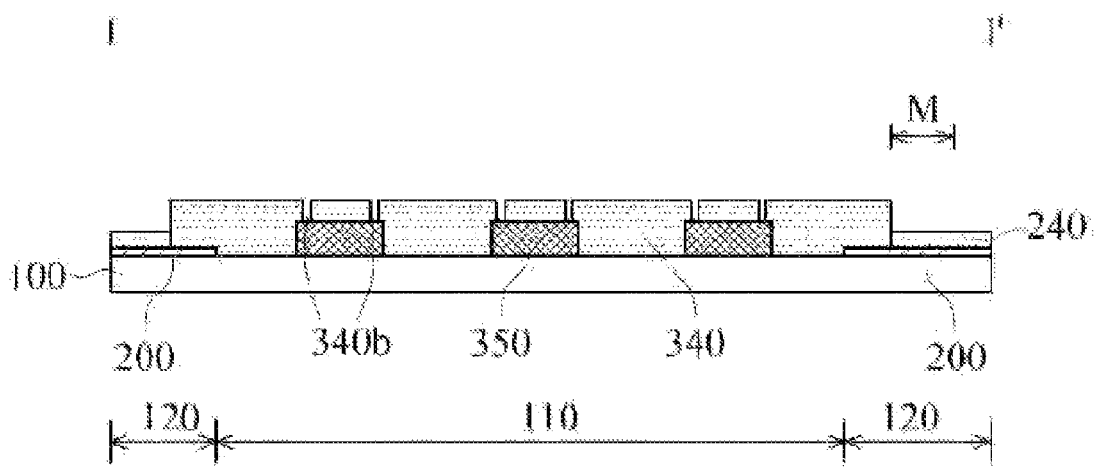
Figure 8D:
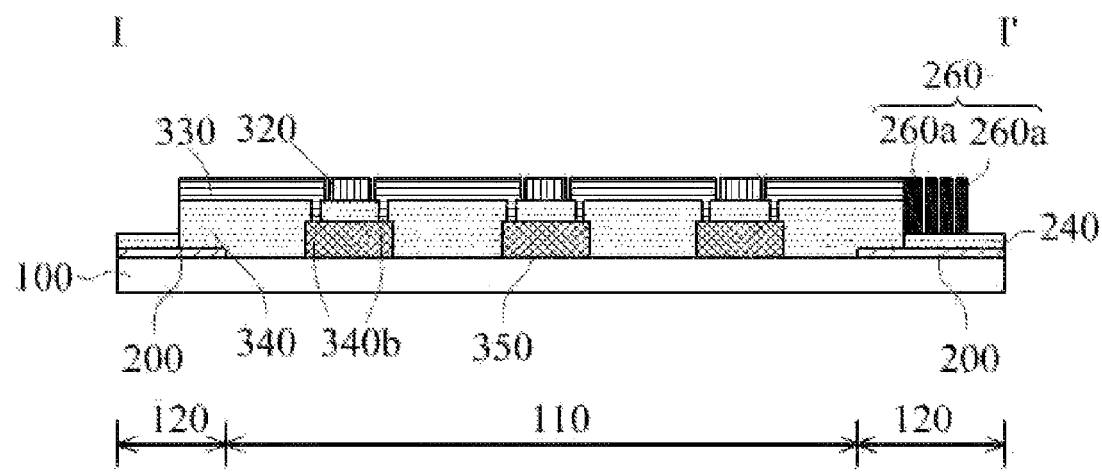
Figure 8E:
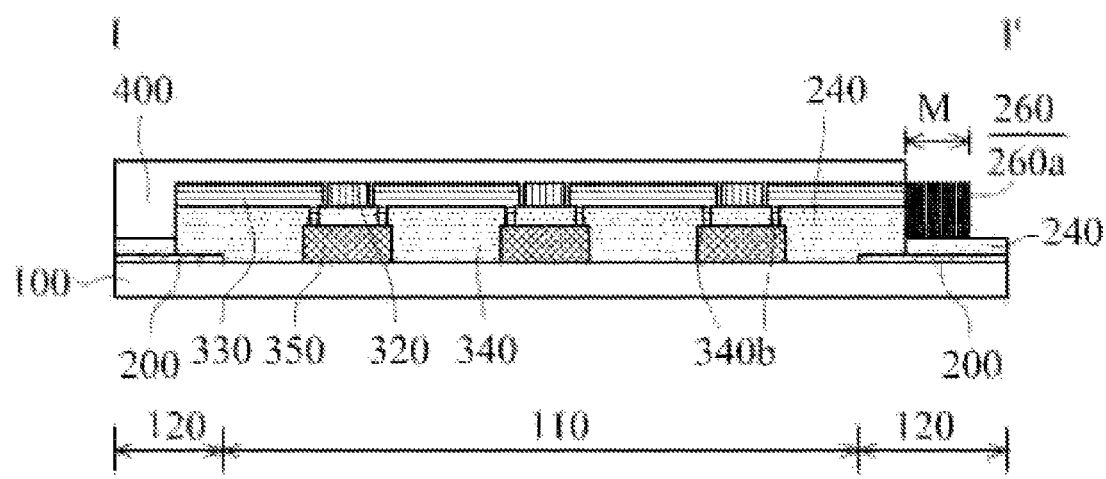

Referring to FIGS. 7E and 8E, wherein FIG. 7E is a plan view of yet another exemplary embodiment of a touch panel according to the invention and FIG. 8E is a cross-sectional view of the touch panel along the line I-I' in FIG. 7E. Elements in FIGS. 3E and 4E that are the same as those in FIGS. 3E and 4E are labeled with the same reference numbers as in FIGS. 3E and 4E and are not described again for brevity. In the embodiment, the touch panel structure is similar to that in FIGS. 3E and 4E, and the difference there between is that the positions of the jumper lines 350, the first lumped electrode elements 310, the connecting lines 320 and the second lumped electrode elements 330 of the sensing electrode layer 300 are changed with respect to the cover plate 100. More specifically, the jumper lines 350 are disposed on the cover plate 100. The insulating layer 340 fully covers the cover plate 100 and the hollows 340*b* are formed on the insulating layer 340 corresponding to the connecting positions of the second lumped electrode elements 330. The first lumped electrode elements 310 and the second lumped electrode elements 330 are in a staggered arrangement on the insulating layer 340. The first lumped electrode elements 310, which are adjacent to each other, are electrically connected to each other by the connecting lines 320 disposed on the insulating layer 340. The jumper lines 350 are electrically connected to the second lumped electrode elements 330, which are adjacent to each other, through the hollows 340*b*. In addition, the protective layer 400 of the touch panel structure in the embodiment covers the first lumped electrode elements 310, the connecting lines 320, the second lumped electrode elements 330 and portions of the traces 260*a*. Further, the traces 260*a* corresponding to the bonding region M are not covered by the protective layer 400. Other features of the touch panel structure in the embodiment are the same as those of the embodiment in FIGS. 3E and 4E, and so the description is omitted herein for brevity.

Figure 9:
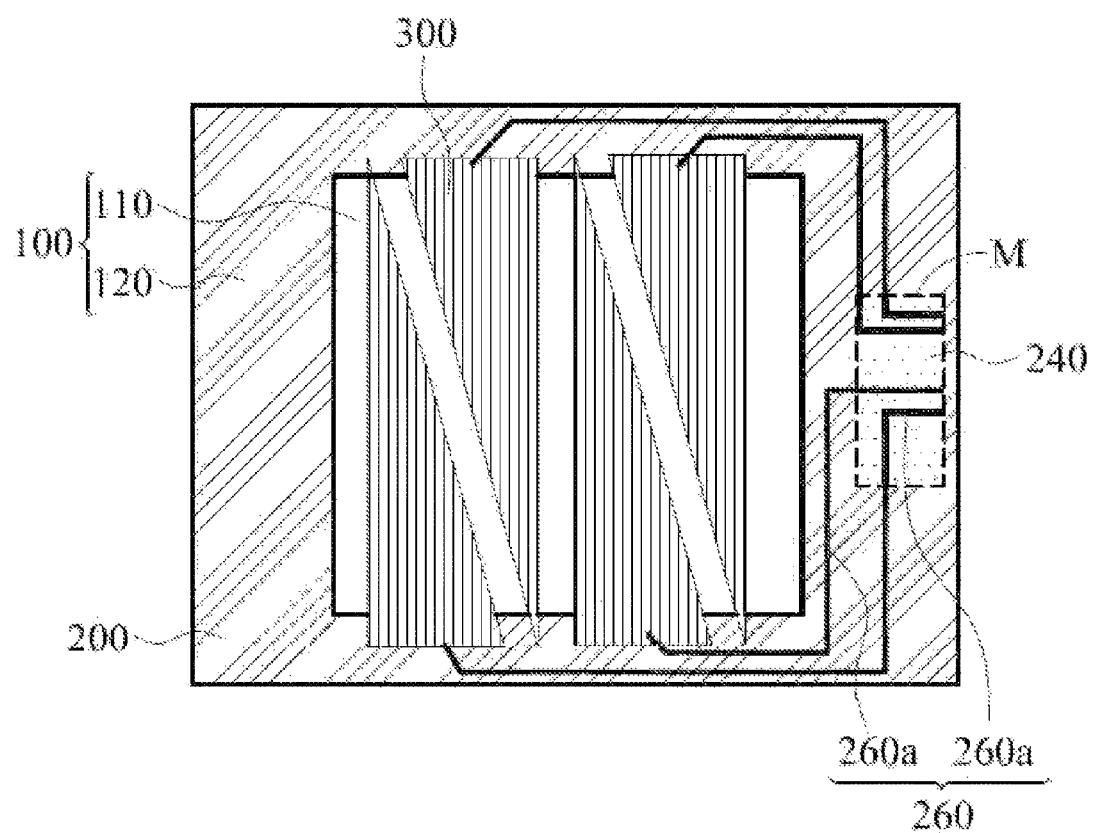
FIG. 9 is a plan view of yet another exemplary embodiment of a structure of a touch panel according to the invention.

In addition, it is easily realized that the structure of the sensing electrode layer 300 is not limited to the structure of the sensing electrode layer with jumpers in the above-mentioned embodiments, and the sensing electrode layer 300 may have a structure without jumpers, as shown in FIG. 9.

A method for forming a touch panel according to the invention is also provided. The method comprises the following steps: a shielding layer is formed on a cover plate, wherein the cover plate has a viewing region and a border region surrounding the viewing region and wherein at least one bonding region is defined in the border region and the shielding layer is disposed corresponding to the border region. An adhesive pattern layer is formed on the shielding layer and in the bonding region. A sensing electrode layer is formed on the cover plate and in the viewing region. A signal trace layer is formed on the shielding layer corresponding to the border region. The signal trace layer comprises a plurality of traces, and each trace has one end electrically connected to the sensing electrode layer and another end assembled onto the adhesive pattern layer corresponding to the bonding region. In one embodiment, the sensing electrode layer may extend from the viewing region to the shielding layer corresponding to the border region.

In addition, specific process steps to form the sensing electrode layer 300 having the structure shown in FIG. 2E, 4E, 6E or 8E are described herein. For other features of each element not mentioned in the specific process, the description of the aforementioned touch panel structures may be referred to.

FIGS. 1A to 1E are plan views of an exemplary embodiment of a method for forming a structure of a touch panel according to the invention, and FIGS. 2A to 2E are cross-sectional views of a structure of a touch panel along the line I-I' in FIGS. 1A to 1E according to the invention. Referring to FIGS. 1A and 2A, a cover plate 100 is provided. The cover plate 100 has a viewing region 110 and a border region 120 surrounding the viewing region 110. Then, a shielding layer 200 is formed on the cover plate 100, and the shielding layer 200 is in the border region 120. The shielding layer 200 has a plurality of hollow portions (not shown), such as the key marks of the common touch devices. In the embodiment, the shielding layer 200 may be made of ink or photoresist materials. A printing process may be adopted for using the ink materials. A lithography process may be adopted for using the photoresist materials.

Referring to FIGS. 1B and 2B, a plurality of first axial electrodes arranged along a first direction and a plurality of second axial electrodes arranged along a second direction are formed on the cover plate 100 corresponding to the viewing region 110 by lithography and etching processes or a printing process. Each first axial electrode comprises a plurality of first lumped electrode elements 310 and a plurality of connecting lines 320 connecting the first lumped electrode elements 310 which are adjacent to each other. Each second axial electrode comprises a plurality of second lumped electrode elements 330, wherein adjacent second lumped electrode elements 330 are disposed on both sides of the connecting line 320. Some of the first lumped electrode elements 310 may extend to the shielding layer 200 corresponding to the border region 120 to ensure good touch sensitivity on the edge region of the touch panel.

Referring to FIGS. 1C and 2C, an insulating layer 340 is formed by lithography and etching processes. The insulating layer 340 comprises a plurality of lumped insulating elements 340a. Each lumped insulating element 340a is disposed on the corresponding connecting line 320. The lumped insulating elements 340a are configured to electrically insulate the connecting lines 320 and the jumper lines 350 formed subsequently.

Further, an adhesive pattern layer 240A is formed on the shielding layer 200 along partial edges of the border region 120. The adhesive pattern layer 240A may be made of an insulating material, such as polypropylene, polyimide, acrylic, silicon dioxide, silicon nitride ($Si_3N_4$), aluminum oxide ($Al_2O_3$), hexamethyldisilazane (HMDS) or combinations thereof. When the adhesive pattern layer 240A comprises the same insulating material as that of the insulating layer 340, the adhesive pattern layer 240A and the insulating layer 340 may be formed simultaneously.

In one embodiment, the adhesive pattern layer may be merely disposed on the shielding layer 200 corresponding to the bonding region M, such as the adhesive pattern layer 240C in FIG. 1C-2 or the adhesive pattern layer 240D in FIG. 1C-3.

In another embodiment, as shown in FIG. 1C-1, the adhesive pattern layer 240B is formed on the shielding layer 200 along an extending direction of traces formed subsequently, such as the traces 260a shown in FIG. 1D. The subsequently formed traces 260a have a width equal to that of the underlying adhesive pattern layer, and therefore the traces and the adhesive pattern layer have the same contour as viewed from a plan view perspective. It is ideal that the subsequently formed traces 260a have a width equal to that of the underlying adhesive pattern layer. In the actual products, the subsequently formed traces 260a may have a width less than that of the underlying adhesive pattern layer.

When the subsequently formed traces 260a have a width equal to or less than that of the underlying adhesive pattern layer, as shown in FIGS. 1C-1 and 1C-3, in addition to the above-mentioned insulating materials, the adhesive pattern layer may be made of conductive materials, such as indium tin oxide, indium zinc oxide, gallium indium tin oxide, nano carbon tube, nano silver line or combinations thereof. In the embodiment, when the adhesive pattern layer is made of a conductive material, the adhesive pattern layer, the first lumped electrode elements 310, the connecting lines 320 and the second lumped electrode elements 330 may be formed simultaneously.

Referring to FIGS. 1D and 2D, a jumper line 350 is correspondingly formed on each lumped insulating element 340a by sputtering, lithography and etching processes to electrically connect the second lumped electrode elements 330 which are adjacent to each other. Therefore, the formation of the sensing electrode layer 300 shown in FIGS. 1E and 2E is finished.

Moreover, a signal trace layer 260 is formed on the adhesive pattern layer 240A, 240B, 240C or 240D corresponding to the border region 120 by sputtering, lithography and etching processes. The signal trace layer 260 comprises a plurality of traces 260a. Each trace 260a has one end electrically connected to the first lumped electrode elements 310 or the second lumped electrode elements 330 and another end assembled to the bonding region M. In the embodiment, the traces 260a and the jumper lines 350 may be formed in different steps.

Referring to FIGS. 1E and 2E, a protective layer 400 is formed on the cover plate 100 to cover portions of the signal trace layer 260 and the sensing electrode layer 300. It is illustrated that the traces 260a corresponding to the bonding region M is not covered by the protective layer 400 so as to subsequently bond the traces 260a in this region to the flexible circuit board. Also, for the purpose of clarity, the contours of the traces 260a and the sensing electrode layer 300 covered by the protective layer 400 are indicated as dotted lines shown in FIG. 1E.

In one embodiment, a peelable glue layer (not shown) may be formed on the traces 260a corresponding to the bonding region M by a printing process before the protective layer 400 is formed. The peelable glue layer and the protective layer 400 thereon may be removed after the protective layer 400 is formed. Therefore, the traces 260a corresponding to the bonding region M is prevented from being covered by the protective layer 400. Moreover, since the adhesive pattern layer 240A is formed between the traces 260a corresponding to the bonding region M and the shielding layer 200, the traces 260a corresponding to the bonding region M are not easily peeled due to the stress induced in peeling the peelable glue layer.

FIGS. 3A to 3E are plan views of another exemplary embodiment of a method for forming a structure of a touch panel according to the invention, and FIGS. 4A to 4E are cross-sectional views of a structure of a touch panel along the line I-I' in FIGS. 3A to 3E according to the invention, wherein elements in FIGS. 3A to 3E and 4A to 4E that are the same as those in FIGS. 1A to 2E are labeled with the same reference numbers as in FIGS. 1A to 2E and are not described again for brevity. Processes in FIGS. 3A to 3B and 4A to 4B are the same as that of the aforementioned embodiment, and so the description is omitted herein for brevity.

Referring to FIGS. 3C and 4C, unlike the aforementioned embodiment, after the structure shown in FIGS. 3B and 4B is formed, the adhesive pattern layer 240 and the insulating layer 340 of the embodiment comprise the same material and are formed in the same step. Hollows 340b are formed in the insulating layer 340 corresponding to each second lumped electrode element 330. For the purpose of clarity, the contours of the first lumped electrode elements 310, the connecting lines 320 and the second lumped electrode elements 330 covered by the insulating layer 340 are indicated as dotted lines.

Referring to FIGS. 3D and 4D, a plurality of jumper lines 350 is formed on the insulating layer 340 by sputtering, lithography and etching processes, such that each jumper line 350 is electrically connected to the second lumped electrode elements 330, which are adjacent to each other, through each pair of hollows 340b. Moreover, a plurality of traces 260a is formed on the adhesive pattern layer 240 corresponding to the border region 120 by sputtering, lithography and etching processes. The traces 260a are also electrically connected to the first lumped electrode elements 310 or the second lumped electrode elements 330 through the hollows 340b.

Referring to FIGS. 3E and 4E, a protective layer 400 is formed on the cover plate 100 to cover portions of the signal trace layer 260 and the shielding layer 200. The traces 260a corresponding to the bonding region M are not covered by the protective layer 400. In the embodiment, the protective layer 400 comprises a plurality of lumped protective elements 400a spaced apart from each other to cover the jumper lines 350.

FIGS. 5A to 5E are plan views of yet another exemplary embodiment of a method for forming a structure of a touch panel according to the invention, and FIGS. 6A to 6E are cross-sectional views of a structure of a touch panel along the line I-I' in FIGS. 5A to 5E according to the invention, wherein elements in FIGS. 5A to 5E and 6A to 6E that are the same as those in FIGS. 1A to 2E are labeled with the same reference numbers as in FIGS. 1A to 2E and are not described again for brevity. Referring to FIGS. 5A and 6A, a cover plate 100 is provided and a shielding layer 200 is formed on the cover plate 100 corresponding to the border region 120.

Referring to FIGS. 5B and 6B, a plurality of jumper lines 350 is formed on the cover plate 100 by sputtering, lithography and etching processes. The jumper lines 350 may be made of the same material as that of the aforementioned embodiments.

Next, referring to FIGS. 5C and 6C, an insulating layer 340 is formed on the cover plate 100. The insulating layer 340 comprises a plurality of lumped insulating elements 340a spaced apart from each other, and the lumped insulating elements 340a is formed on the jumper lines 350. Moreover, an adhesive pattern layer 240A is formed on the shielding layer 200 along partial edges of the border region 120. In addition, the adhesive pattern layer may have other configurations, as the adhesive pattern layer shown in FIGS. 5C-1 to 5C-3. In the embodiment, the adhesive pattern layer 240A, 240B, 240C or 240D and the insulating layer 340 may be formed simultaneously or sequentially.

Referring to FIGS. 5D and 6D, a plurality of first lumped electrode elements 310 and a plurality of second lumped electrode elements 330 in a staggered arrangement are formed on the cover plate 100 corresponding to the viewing region 110. Some of the second lumped electrode elements 330 extend to the shielding layer 200 corresponding to the border region 120. The second lumped electrode elements 330, which are adjacent to each other, are electrically connected to each other by the jumper lines 350. Connecting lines 320 are correspondingly formed on the lumped insulating elements 340a to electrically connect the first lumped electrode elements 310 which are adjacent to each other. Moreover, a plurality of traces 260a is formed on the adhesive pattern layer 240A, 240B, 240C or 240D corresponding to the border region 120 to electrically connect the first lumped electrode elements 310 and the second lumped electrode elements 330. In another embodiment, the traces 260a are formed before the first lumped electrode elements 310 and the second lumped electrode elements 330 are formed.

Referring to FIGS. 5E and 6E, a protective layer 400 is formed on the cover plate 100 to cover portions of the signal trace layer 260 and the shielding layer 200. The traces 260a corresponding to the bonding region M are not covered by the protective layer 400.

FIGS. 7A to 7E are plan views of yet another exemplary embodiment of a method for forming a structure of a touch panel according to the invention, and FIGS. 8A to 8E are cross-sectional views of a structure of a touch panel along the line I-I' in FIGS. 7A to 7E according to the invention, wherein elements in FIGS. 7A to 7E and 8A to 8E that are the same as those in FIGS. 3A to 4E are labeled with the same reference numbers as in FIGS. 3A to 4E and are not described again for brevity. Processes in FIGS. 7A to 7B and 8A to 8B are the same as those of the embodiment in FIGS. 5A to 5B and 6A to 8B, and so the description is omitted herein for brevity.

Referring to FIGS. 7C and 8C, unlike the aforementioned embodiment, after the structure shown in FIGS. 7B and 8B is formed, the adhesive pattern layer 240 and the insulating layer 340 of the embodiment are formed on the cover plate 100 corresponding to the viewing region 110. In the embodiment, the adhesive pattern layer 240 and the insulating layer 340 comprise the same material and are formed in the same step. The insulating layer 340 comprises a plurality of hollows 340b therein, and the hollows 340b expose portions of the jumper lines 350. The adhesive pattern layer 240 may be made of the same material as that of the adhesive pattern layer 240A, 240B, 240C or 240D in the aforementioned embodiments.

Referring to FIGS. 7D and 8D, a plurality of first lumped electrode elements 310 and a plurality of second lumped electrode elements 330 in a staggered arrangement are formed on the adhesive pattern layer 240. Some of the first lumped electrode elements 310 extend to the adhesive pattern layer 240 corresponding to the border region 120. In the embodiment, connecting lines 320 are formed simultaneously to electrically connect the second lumped electrode elements 330 which are adjacent to each other. Moreover, a plurality of traces 260a is formed on the adhesive pattern layer 240 corresponding to the border region 120 to electrically connect the first lumped electrode elements 310 and the second lumped electrode elements 330. In another embodiment, the traces 260a is formed before the first lumped electrode elements 310 and the second lumped electrode elements 330 are formed.

Referring to FIGS. 7E and 8E, a protective layer 400 is formed on the cover plate 100 to cover the traces 260a, the first lumped electrode elements 310, the connecting lines 320 and the second lumped electrode elements 330. The traces 260a corresponding to the bonding region M are not covered by the protective layer 400.

According to the embodiments, after the shielding layer is formed on the border region and before the traces are formed thereon, an adhesive pattern layer is formed between the shielding layer and the traces in the bonding region. Since the adhesion between the shielding layer and the traces are enhanced by the adhesive pattern layer, the problem of the traces easily peeling off the shielding layer can be addressed when the flexible circuit board is bonded or the peelable glue layer is removed. Moreover, when the sensing electrode layer has the electrode structure with the insulating layer as shown in FIG. 1E, the adhesive pattern layer and the insulating layer can be formed simultaneously by the same process during the formation of the insulating layer. Therefore, the number of steps in the process is not increased.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, comprising:
   a cover plate;
   a shielding layer disposed on the cover plate, wherein a portion of the cover plate that underlies the shielding layer defines a border region and a portion of the cover plate that does not underlie the shielding layer defines a viewing region;
   an adhesive pattern layer disposed on the shielding layer;
   a sensing electrode layer disposed on the cover plate and extending from the viewing region to the shielding layer, wherein the sensing electrode layer physically contacts the shielding layer; and wherein
   the adhesive pattern layer is merely disposed within the border region, and
   the sensing electrode layer physically contacts a sidewall of the adhesive pattern layer;
   a signal trace laye overlying the shielding layer, wherein:
      the signal trace layer comprises a plurality of traces, and
      each trace has one end electrically connected to the sensing electrode layer and an another end assembled onto the adhesive pattern layer.

2. The touch panel as claimed in claim 1, wherein the traces have a width equal to or less than that of the adhesive pattern layer.

3. The touch panel as claimed in claim 2, wherein the adhesive pattern layer is made of a conductive material.

4. The touch panel as claimed in claim 3, wherein the adhesive pattern layer is made of indium tin oxide, indium zinc oxide, gallium indium tin oxide, nano carbon tube, nano silver line or combinations thereof.

5. The touch panel as claimed in claim 1, wherein the adhesive pattern layer is made of an insulating material.

6. The touch panel as claimed in claim 5, wherein the adhesive pattern layer is made of polypropylene, polyimide, acrylic resin, silicon dioxide, silicon nitride, aluminum oxide, hexamethyldisilylamine or combinations thereof.

7. The touch panel as claimed in claim 1, wherein the sensing electrode layer comprises:
   a plurality of first axial electrodes arranged along a first direction, wherein each first axial electrode comprises a plurality of first lumped electrode elements and a plurality of connecting lines connecting adjacent first lumped electrode elements;
   a plurality of second axial electrodes arranged along a second direction, wherein:
      each second axial electrode comprises a plurality of second lumped electrode elements, and
      adjacent second lumped electrode elements of a second axial electrode are separated by a connecting line;
   a plurality of jumper lines electrically connecting the adjacent second lumped electrode elements; and
   an insulating layer electrically insulating the connecting lines from the jumper lines.

8. The touch panel as claimed in claim 7, wherein:
   the insulating layer comprises a plurality of lumped insulating elements, and
   each lumped insulating element is disposed between a connecting line and a jumper line.

9. The touch panel as claimed in claim 1, wherein the shielding layer comprises a plurality of hollow portions to form key marks.

10. The touch panel as claimed in claim 9, further comprising one or more color layers formed corresponding to the hollow portions of the shielding layer.

11. The touch panel as claimed in claim 9, wherein the sensing electrode layer extends to the hollow portions of the shielding layer to execute one or more touch sensing functions within the border region.

12. The touch panel as claimed in claim 1, wherein the sensing electrode layer overlies the shielding layer.

13. The touch panel as claimed in claim 1, wherein the signal trace layer overlies merely a portion of the adhesive pattern layer.

14. The touch panel as claimed in claim 1, comprising a protective layer overlying the cover plate, the shielding layer, and the sensing electrode layer, wherein the protective layer does not overlie a portion of the signal trace layer that overlies the adhesive pattern layer.

15. A method for forming a touch panel, comprising:
   forming a shielding layer on a cover plate, wherein:
      a portion of the cover plate that underlies the shielding layer defines a border region and a portion of the cover plate that does not underlie the shielding layer defines a viewing region, and
      the border region surrounds the viewing region;
   forming an adhesive pattern layer on the shielding layer;
   forming a sensing electrode layer on the cover plate and extending from the viewing region to the shielding layer, wherein the sensing electrode layer physically contacts a sidewall of the adhesive pattern layer; and wherein the adhesive pattern layer is merely disposed within the border region, and the sensing electrode layer physically contacts a sidewall of the adhesive pattern layer;
   forming a signal trace layer overlying the the shielding layer, wherein:
      the signal trace layer comprises a plurality of traces, and
      each trace has one end electrically connected to the sensing electrode layer and an another end assembled onto the adhesive pattern layer.

16. The method of claim 15, wherein the sensing electrode layer comprises:
   a plurality of first axial electrodes arranged along a first direction, wherein each first axial electrode comprises a plurality of first lumped electrode elements and a plurality of connecting lines connecting adjacent first lumped electrode elements;
   a plurality of second axial electrodes arranged along a second direction, wherein:
      each second axial electrode comprises a plurality of second lumped electrode elements, and
      adjacent second lumped electrode elements of a second axial electrode are separated by a connecting line;

a plurality of juniper lines electrically connecting the adjacent second lumped electrode elements; and an insulating layer electrically insulating the connecting lines from the jumper lines.

17. The method of claim 16, wherein:

the insulating layer comprises a plurality of lumped insulating elements, and each lumped insulating element is disposed between a connecting line and a jumper line.

18. The method of claim 16, wherein:

the adhesive pattern layer is made of a conductive material, and the adhesive pattern layer, the first lumped electrode elements, the connecting lines, and the second lumped electrode elements are formed simultaneously.

19. A touch panel, comprising:

a cover plate;

a shielding layer disposed on the cover plate, wherein a portion of the cover plate that underlies the shielding layer defines a border region and a portion of the cover plate that does not underlie the shielding layer defines a viewing region;

an adhesive pattern layer disposed on the shielding layer;

a sensing electrode layer disposed on the cover plate and extending from the viewing region to the shielding layer; wherein the adhesive pattern layer is merely disposed within the border region, and the sensing electrode layer physically contacts a sidewall of the adhesive pattern layer;

a signal trace layer overlying the shielding layer, wherein:

the signal trace layer comprises a plurality of traces, and each trace has one end electrically connected to the sensing electrode layer and an another end assembled onto the adhesive pattern; and a protective layer overlying the cover plate, the shielding layer, and the sensing electrode layer, wherein the protective layer does not overlie a portion of the signal trace layer that overlies the adhesive pattern layer.

* * * * *